(12) United States Patent
Emerton et al.

(10) Patent No.: US 9,256,089 B2
(45) Date of Patent: Feb. 9, 2016

(54) OBJECT-DETECTING BACKLIGHT UNIT

(75) Inventors: Neil Emerton, Redmond, WA (US); Timothy Andrew Large, Bellevue, WA (US); Catherine N. Boulanger, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 92 days.

(21) Appl. No.: 13/525,070

(22) Filed: Jun. 15, 2012

(65) Prior Publication Data

US 2013/0335387 A1    Dec. 19, 2013

(51) Int. Cl.
| | |
|---|---|
| G06F 3/038 | (2013.01) |
| G09G 5/00 | (2006.01) |
| G02F 1/133 | (2006.01) |
| G02F 1/1333 | (2006.01) |
| G02F 1/1335 | (2006.01) |
| G06F 3/042 | (2006.01) |

(52) U.S. Cl.
CPC .......... *G02F 1/13318* (2013.01); *G02F 1/1336* (2013.01); *G02F 1/13338* (2013.01); *G06F 3/042* (2013.01)

(58) Field of Classification Search
CPC ............ G02F 1/13318; G02F 1/13338; G02F 1/1336; G06F 3/042
USPC ........................... 345/207; 250/206.1; 349/61
See application file for complete search history.

(56) References Cited

U.S. PATENT DOCUMENTS

| | | |
|---|---|---|
| 4,046,975 A | 9/1977 | Seeger, Jr. |
| 4,065,649 A | 12/1977 | Carter et al. |
| 4,243,861 A | 1/1981 | Strandwitz |
| 4,302,648 A | 11/1981 | Sado et al. |
| 4,317,013 A | 2/1982 | Larson |
| 4,365,130 A | 12/1982 | Christensen |
| 4,492,829 A | 1/1985 | Rodrique |

(Continued)

FOREIGN PATENT DOCUMENTS

| | | |
|---|---|---|
| CN | 1515937 | 7/2004 |
| CN | 1650202 | 8/2005 |

(Continued)

OTHER PUBLICATIONS

"Developing Next-Generation Human Interfaces using Capacitive and Infrared Proximity Sensing", Retrieved at <<http://www.silabs.com/pages/DownloadDoc.aspx?FILEURL=support%20documents/technicaldocs/capacitive%20and%20proximity%20sensing_wp.pdf& src=SearchResults>>, Retrieved Date: Jan. 3, 2012, pp. 10.

(Continued)

*Primary Examiner* — Charles Hicks
*Assistant Examiner* — Brent D Castiaux
(74) *Attorney, Agent, or Firm* — Jeremy Shodgrass; Judy Yee; Micky Minhas

(57) ABSTRACT

This document describes techniques and apparatuses for implementing an object-detecting backlight unit for a display device. An object-detecting backlight unit includes two or more light sources configured to provide light to a display to form an image, and a light sensor configured to receive reflected light when an object is near the display and determine that the reflected light originated from a region of the display. The reflected light is caused by light from the image reflecting off of the object back towards the display. The backlight unit is configured to detect a position of the object based on the region of the display from which the reflected light originated.

20 Claims, 5 Drawing Sheets

(56) References Cited

U.S. PATENT DOCUMENTS

| | | |
|---|---|---|
| 4,527,021 A | 7/1985 | Morikawa et al. |
| 4,559,426 A | 12/1985 | Van Zeeland et al. |
| 4,588,187 A | 5/1986 | Dell |
| 4,607,147 A | 8/1986 | Ono et al. |
| 4,651,133 A | 3/1987 | Ganesan et al. |
| 4,735,495 A | 4/1988 | Henkes |
| 5,220,521 A | 6/1993 | Kikinis |
| 5,283,559 A | 2/1994 | Kalendra et al. |
| 5,319,455 A | 6/1994 | Hoarty et al. |
| 5,331,443 A | 7/1994 | Stanisci |
| 5,548,477 A | 8/1996 | Kumar et al. |
| 5,558,577 A | 9/1996 | Kato |
| 5,618,232 A | 4/1997 | Martin |
| 5,681,220 A | 10/1997 | Bertram et al. |
| 5,745,376 A | 4/1998 | Barker et al. |
| 5,748,114 A | 5/1998 | Koehn |
| 5,781,406 A | 7/1998 | Hunte |
| 5,806,955 A | 9/1998 | Parkyn, Jr. et al. |
| 5,807,175 A | 9/1998 | Davis et al. |
| 5,808,713 A | 9/1998 | Broer et al. |
| 5,818,361 A | 10/1998 | Acevedo |
| 5,828,770 A | 10/1998 | Leis et al. |
| 5,838,403 A | 11/1998 | Jannson et al. |
| 5,874,697 A | 2/1999 | Selker et al. |
| 5,921,652 A | 7/1999 | Parker et al. |
| 5,926,170 A | 7/1999 | Oba |
| 5,967,637 A | 10/1999 | Ishikawa et al. |
| 5,971,635 A | 10/1999 | Wise |
| 6,002,389 A | 12/1999 | Kasser |
| 6,005,209 A | 12/1999 | Burleson et al. |
| 6,012,714 A | 1/2000 | Worley et al. |
| 6,040,823 A | 3/2000 | Seffernick et al. |
| 6,044,717 A | 4/2000 | Biegelsen et al. |
| 6,061,644 A | 5/2000 | Leis |
| 6,072,551 A | 6/2000 | Jannson et al. |
| 6,112,797 A | 9/2000 | Colson et al. |
| 6,124,906 A | 9/2000 | Kawada et al. |
| 6,129,444 A | 10/2000 | Tognoni |
| 6,172,807 B1 | 1/2001 | Akamatsu |
| 6,178,443 B1 | 1/2001 | Lin |
| 6,215,590 B1 | 4/2001 | Okano |
| 6,254,105 B1 | 7/2001 | Rinde et al. |
| 6,256,447 B1 | 7/2001 | Laine |
| 6,279,060 B1 | 8/2001 | Luke et al. |
| 6,329,617 B1 | 12/2001 | Burgess |
| 6,344,791 B1 | 2/2002 | Armstrong |
| 6,351,273 B1 | 2/2002 | Lemelson et al. |
| 6,380,497 B1 | 4/2002 | Hashimoto et al. |
| 6,411,266 B1 | 6/2002 | Maguire, Jr. |
| 6,437,682 B1 | 8/2002 | Vance |
| 6,511,378 B1 | 1/2003 | Bhatt et al. |
| 6,529,179 B1 | 3/2003 | Hashimoto et al. |
| 6,532,147 B1 | 3/2003 | Christ, Jr. |
| 6,543,949 B1 | 4/2003 | Ritchey et al. |
| 6,565,439 B2 | 5/2003 | Shinohara et al. |
| 6,597,347 B1 | 7/2003 | Yasutake |
| 6,600,121 B1 | 7/2003 | Olodort et al. |
| 6,603,408 B1 | 8/2003 | Gaba |
| 6,617,536 B2 | 9/2003 | Kawaguchi |
| 6,648,485 B1 | 11/2003 | Colgan et al. |
| 6,685,369 B2 | 2/2004 | Lien |
| 6,704,864 B1 | 3/2004 | Philyaw |
| 6,721,019 B2 | 4/2004 | Kono et al. |
| 6,725,318 B1 | 4/2004 | Sherman et al. |
| 6,774,888 B1 | 8/2004 | Genduso |
| 6,776,546 B2 | 8/2004 | Kraus et al. |
| 6,784,869 B1 | 8/2004 | Clark et al. |
| 6,813,143 B2 | 11/2004 | Makela |
| 6,819,316 B2 | 11/2004 | Schulz et al. |
| 6,856,506 B2 | 2/2005 | Doherty et al. |
| 6,861,961 B2 | 3/2005 | Sandbach et al. |
| 6,867,828 B2 | 3/2005 | Taira et al. |
| 6,870,671 B2 | 3/2005 | Travis |
| 6,895,164 B2 | 5/2005 | Saccomanno |
| 6,898,315 B2 | 5/2005 | Guha |
| 6,914,197 B2 | 7/2005 | Doherty et al. |
| 6,950,950 B2 | 9/2005 | Sawyers et al. |
| 6,970,957 B1 | 11/2005 | Oshins et al. |
| 6,976,799 B2 | 12/2005 | Kim et al. |
| 6,980,177 B2 | 12/2005 | Struyk |
| 6,981,792 B2 | 1/2006 | Nagakubo et al. |
| 7,006,080 B2 * | 2/2006 | Gettemy ................ 345/175 |
| 7,051,149 B2 | 5/2006 | Wang et al. |
| 7,073,933 B2 | 7/2006 | Gotoh et al. |
| 7,083,295 B1 | 8/2006 | Hanna |
| 7,091,436 B2 | 8/2006 | Serban |
| 7,104,679 B2 | 9/2006 | Shin et al. |
| 7,106,222 B2 | 9/2006 | Ward et al. |
| 7,123,292 B1 | 10/2006 | Seeger et al. |
| 7,151,635 B2 | 12/2006 | Bidnyk et al. |
| 7,153,017 B2 | 12/2006 | Yamashita et al. |
| 7,194,662 B2 | 3/2007 | Do et al. |
| 7,213,991 B2 | 5/2007 | Chapman et al. |
| 7,224,830 B2 | 5/2007 | Nefian et al. |
| 7,260,221 B1 | 8/2007 | Atsmon |
| 7,260,823 B2 | 8/2007 | Schlack et al. |
| 7,277,087 B2 | 10/2007 | Hill et al. |
| 7,364,343 B2 | 4/2008 | Keuper et al. |
| 7,370,342 B2 | 5/2008 | Ismail et al. |
| 7,374,312 B2 | 5/2008 | Feng et al. |
| 7,375,885 B2 | 5/2008 | Ijzerman et al. |
| 7,384,178 B2 | 6/2008 | Sumida et al. |
| 7,400,377 B2 | 7/2008 | Evans et al. |
| 7,400,817 B2 | 7/2008 | Lee et al. |
| 7,410,286 B2 | 8/2008 | Travis |
| 7,431,489 B2 | 10/2008 | Yeo et al. |
| 7,447,934 B2 | 11/2008 | Dasari et al. |
| 7,469,386 B2 | 12/2008 | Bear et al. |
| 7,499,037 B2 | 3/2009 | Lube |
| 7,502,803 B2 | 3/2009 | Culter et al. |
| 7,503,684 B2 | 3/2009 | Ueno et al. |
| 7,528,374 B2 | 5/2009 | Smitt et al. |
| 7,542,052 B2 | 6/2009 | Solomon et al. |
| 7,545,429 B2 | 6/2009 | Travis |
| 7,558,594 B2 | 7/2009 | Wilson |
| 7,559,834 B1 | 7/2009 | York |
| 7,572,045 B2 | 8/2009 | Hoelen et al. |
| RE40,891 E | 9/2009 | Yasutake |
| 7,631,327 B2 | 12/2009 | Dempski et al. |
| 7,636,921 B2 | 12/2009 | Louie |
| 7,639,876 B2 | 12/2009 | Clary et al. |
| 7,656,392 B2 | 2/2010 | Bolender |
| 7,660,047 B1 | 2/2010 | Travis et al. |
| 7,675,598 B2 | 3/2010 | Hong |
| 7,728,923 B2 | 6/2010 | Kim et al. |
| 7,733,326 B1 | 6/2010 | Adiseshan |
| 7,773,076 B2 | 8/2010 | Pittel et al. |
| 7,773,121 B2 | 8/2010 | Huntsberger et al. |
| 7,774,155 B2 | 8/2010 | Sato et al. |
| 7,777,972 B1 | 8/2010 | Chen et al. |
| 7,782,341 B2 | 8/2010 | Kothandaraman |
| 7,782,342 B2 | 8/2010 | Koh |
| 7,813,715 B2 | 10/2010 | McKillop et al. |
| 7,815,358 B2 | 10/2010 | Inditsky |
| 7,844,985 B2 | 11/2010 | Hendricks et al. |
| 7,884,807 B2 | 2/2011 | Hovden et al. |
| D636,397 S | 4/2011 | Green |
| 7,928,964 B2 | 4/2011 | Kolmykov-Zotov et al. |
| 7,936,501 B2 | 5/2011 | Smith et al. |
| 7,945,717 B2 | 5/2011 | Rivalsi |
| 7,957,082 B2 | 6/2011 | Mi et al. |
| 7,965,268 B2 | 6/2011 | Gass et al. |
| 7,970,246 B2 | 6/2011 | Travis et al. |
| 7,973,771 B2 | 7/2011 | Geaghan |
| 7,978,281 B2 | 7/2011 | Vergith et al. |
| 7,991,257 B1 | 8/2011 | Coleman |
| 8,007,158 B2 | 8/2011 | Woo et al. |
| 8,018,579 B1 | 9/2011 | Krah |
| 8,053,688 B2 | 11/2011 | Conzola et al. |
| 8,065,624 B2 | 11/2011 | Morin et al. |
| 8,069,356 B2 | 11/2011 | Rathi et al. |
| 8,098,233 B2 | 1/2012 | Hotelling et al. |
| 8,115,499 B2 | 2/2012 | Osoinach et al. |
| 8,130,203 B2 | 3/2012 | Westerman |

(56) References Cited

U.S. PATENT DOCUMENTS

| | | | |
|---|---|---|---|
| 8,149,272 B2 | 4/2012 | Evans et al. | |
| 8,154,524 B2 | 4/2012 | Wilson et al. | |
| D659,139 S | 5/2012 | Gengler | |
| 8,169,421 B2 | 5/2012 | Wright et al. | |
| 8,189,973 B2 | 5/2012 | Travis et al. | |
| 8,229,509 B2 | 7/2012 | Paek et al. | |
| 8,229,522 B2 | 7/2012 | Kim et al. | |
| 8,251,563 B2 | 8/2012 | Papakonstantinou et al. | |
| 8,310,508 B2 | 11/2012 | Hekstra et al. | |
| 8,325,416 B2 | 12/2012 | Lesage et al. | |
| 8,354,806 B2 | 1/2013 | Travis et al. | |
| 8,362,975 B2 | 1/2013 | Uehara | |
| 8,466,954 B2 | 6/2013 | Ko et al. | |
| 8,467,133 B2 | 6/2013 | Miller | |
| 8,548,608 B2 | 10/2013 | Perek et al. | |
| 8,565,560 B2 | 10/2013 | Popovich et al. | |
| 8,614,666 B2 | 12/2013 | Whitman et al. | |
| 8,903,517 B2 | 12/2014 | Perek et al. | |
| 8,947,353 B2 | 2/2015 | Boulanger et al. | |
| 9,201,185 B2 | 12/2015 | Large | |
| 2002/0008854 A1 | 1/2002 | Travis et al. | |
| 2002/0134828 A1 | 9/2002 | Sandbach et al. | |
| 2002/0163510 A1 | 11/2002 | Williams et al. | |
| 2003/0137821 A1 | 7/2003 | Gotoh et al. | |
| 2003/0197687 A1 | 10/2003 | Shetter | |
| 2004/0258924 A1 | 12/2004 | Berger et al. | |
| 2004/0268000 A1 | 12/2004 | Barker et al. | |
| 2005/0055498 A1 | 3/2005 | Beckert et al. | |
| 2005/0057515 A1 | 3/2005 | Bathiche | |
| 2005/0059489 A1 | 3/2005 | Kim | |
| 2005/0062715 A1 | 3/2005 | Tsuji et al. | |
| 2005/0146512 A1 | 7/2005 | Hill et al. | |
| 2005/0264653 A1 | 12/2005 | Starkweather et al. | |
| 2005/0264988 A1 | 12/2005 | Nicolosi | |
| 2005/0285703 A1 | 12/2005 | Wheeler et al. | |
| 2006/0010400 A1* | 1/2006 | Dehlin et al. | 715/856 |
| 2006/0012767 A1 | 1/2006 | Komatsuda et al. | |
| 2006/0028476 A1 | 2/2006 | Sobel | |
| 2006/0028838 A1 | 2/2006 | Imade | |
| 2006/0083004 A1 | 4/2006 | Cok | |
| 2006/0085658 A1 | 4/2006 | Allen et al. | |
| 2006/0102914 A1 | 5/2006 | Smits et al. | |
| 2006/0125799 A1 | 6/2006 | Hillis et al. | |
| 2006/0132423 A1 | 6/2006 | Travis | |
| 2006/0146573 A1 | 7/2006 | Iwauchi et al. | |
| 2006/0154725 A1 | 7/2006 | Glaser et al. | |
| 2006/0156415 A1 | 7/2006 | Rubinstein et al. | |
| 2006/0181514 A1 | 8/2006 | Newman | |
| 2006/0187216 A1 | 8/2006 | Trent, Jr. et al. | |
| 2006/0195522 A1 | 8/2006 | Miyazaki | |
| 2006/0215244 A1 | 9/2006 | Yosha et al. | |
| 2006/0262185 A1 | 11/2006 | Cha et al. | |
| 2006/0287982 A1 | 12/2006 | Sheldon et al. | |
| 2007/0019181 A1* | 1/2007 | Sinclair et al. | 356/4.01 |
| 2007/0046625 A1 | 3/2007 | Yee | |
| 2007/0047221 A1 | 3/2007 | Park | |
| 2007/0062089 A1 | 3/2007 | Homer et al. | |
| 2007/0072474 A1 | 3/2007 | Beasley et al. | |
| 2007/0076434 A1 | 4/2007 | Uehara et al. | |
| 2007/0080813 A1 | 4/2007 | Melvin | |
| 2007/0091638 A1 | 4/2007 | Ijzerman et al. | |
| 2007/0122027 A1 | 5/2007 | Kunita et al. | |
| 2007/0182663 A1 | 8/2007 | Biech | |
| 2007/0182722 A1 | 8/2007 | Hotelling et al. | |
| 2007/0188478 A1 | 8/2007 | Silverstein et al. | |
| 2007/0201246 A1 | 8/2007 | Yeo et al. | |
| 2007/0217224 A1 | 9/2007 | Kao et al. | |
| 2007/0222766 A1 | 9/2007 | Bolender | |
| 2007/0234420 A1 | 10/2007 | Novotney et al. | |
| 2007/0236408 A1 | 10/2007 | Yamaguchi et al. | |
| 2007/0236475 A1 | 10/2007 | Wherry | |
| 2007/0247432 A1 | 10/2007 | Oakley | |
| 2007/0260892 A1 | 11/2007 | Paul et al. | |
| 2007/0274094 A1 | 11/2007 | Schultz et al. | |
| 2007/0274095 A1 | 11/2007 | Destain | |
| 2007/0274099 A1 | 11/2007 | Tai et al. | |
| 2007/0283179 A1 | 12/2007 | Burnett et al. | |
| 2008/0001924 A1 | 1/2008 | de los Reyes et al. | |
| 2008/0005423 A1 | 1/2008 | Jacobs et al. | |
| 2008/0013809 A1 | 1/2008 | Zhu et al. | |
| 2008/0019150 A1 | 1/2008 | Park et al. | |
| 2008/0037284 A1 | 2/2008 | Rudisill | |
| 2008/0104437 A1 | 5/2008 | Lee | |
| 2008/0122803 A1* | 5/2008 | Izadi et al. | 345/175 |
| 2008/0150913 A1* | 6/2008 | Bell et al. | 345/175 |
| 2008/0151478 A1 | 6/2008 | Chern | |
| 2008/0158185 A1 | 7/2008 | Westerman | |
| 2008/0211787 A1 | 9/2008 | Nakao et al. | |
| 2008/0219025 A1 | 9/2008 | Spitzer et al. | |
| 2008/0238884 A1 | 10/2008 | Harish | |
| 2008/0253822 A1 | 10/2008 | Matias | |
| 2008/0309636 A1 | 12/2008 | Feng et al. | |
| 2008/0316002 A1 | 12/2008 | Brunet et al. | |
| 2008/0316768 A1 | 12/2008 | Travis | |
| 2008/0320190 A1 | 12/2008 | Lydon et al. | |
| 2009/0009476 A1 | 1/2009 | Daley, III | |
| 2009/0040426 A1 | 2/2009 | Mather et al. | |
| 2009/0073957 A1 | 3/2009 | Newland et al. | |
| 2009/0131134 A1 | 5/2009 | Baerlocher et al. | |
| 2009/0135318 A1* | 5/2009 | Tateuchi et al. | 349/12 |
| 2009/0140985 A1 | 6/2009 | Liu | |
| 2009/0146992 A1 | 6/2009 | Fukunaga et al. | |
| 2009/0152748 A1 | 6/2009 | Wang et al. | |
| 2009/0158221 A1 | 6/2009 | Nielsen et al. | |
| 2009/0161385 A1 | 6/2009 | Parker et al. | |
| 2009/0167728 A1 | 7/2009 | Geaghan et al. | |
| 2009/0195497 A1 | 8/2009 | Fitzgerald et al. | |
| 2009/0231275 A1 | 9/2009 | Odgers | |
| 2009/0239586 A1 | 9/2009 | Boeve et al. | |
| 2009/0244832 A1 | 10/2009 | Behar et al. | |
| 2009/0251008 A1 | 10/2009 | Sugaya | |
| 2009/0262492 A1 | 10/2009 | Whitchurch et al. | |
| 2009/0265670 A1 | 10/2009 | Kim et al. | |
| 2009/0276734 A1* | 11/2009 | Taylor et al. | 715/863 |
| 2009/0285491 A1 | 11/2009 | Ravenscroft et al. | |
| 2009/0303204 A1 | 12/2009 | Nasiri et al. | |
| 2009/0316072 A1 | 12/2009 | Okumura et al. | |
| 2009/0320244 A1 | 12/2009 | Lin | |
| 2009/0321490 A1 | 12/2009 | Groene et al. | |
| 2010/0001963 A1 | 1/2010 | Doray et al. | |
| 2010/0013738 A1 | 1/2010 | Covannon et al. | |
| 2010/0026656 A1 | 2/2010 | Hotelling et al. | |
| 2010/0038821 A1 | 2/2010 | Jenkins et al. | |
| 2010/0045609 A1 | 2/2010 | Do et al. | |
| 2010/0045633 A1 | 2/2010 | Gettemy | |
| 2010/0051356 A1 | 3/2010 | Stern et al. | |
| 2010/0051432 A1 | 3/2010 | Lin et al. | |
| 2010/0053534 A1 | 3/2010 | Hsieh et al. | |
| 2010/0077237 A1 | 3/2010 | Sawyers | |
| 2010/0079861 A1 | 4/2010 | Powell | |
| 2010/0081377 A1 | 4/2010 | Chatterjee et al. | |
| 2010/0083108 A1 | 4/2010 | Rider et al. | |
| 2010/0085321 A1 | 4/2010 | Pundsack | |
| 2010/0103112 A1 | 4/2010 | Yoo et al. | |
| 2010/0117993 A1 | 5/2010 | Kent | |
| 2010/0123686 A1 | 5/2010 | Klinghult et al. | |
| 2010/0135036 A1 | 6/2010 | Matsuba et al. | |
| 2010/0149111 A1 | 6/2010 | Olien | |
| 2010/0149134 A1 | 6/2010 | Westerman et al. | |
| 2010/0156798 A1 | 6/2010 | Archer | |
| 2010/0156913 A1 | 6/2010 | Ortega et al. | |
| 2010/0161522 A1 | 6/2010 | Tirpak et al. | |
| 2010/0164857 A1 | 7/2010 | Liu et al. | |
| 2010/0171891 A1 | 7/2010 | Kaji et al. | |
| 2010/0174421 A1 | 7/2010 | Tsai et al. | |
| 2010/0180063 A1 | 7/2010 | Ananny et al. | |
| 2010/0188299 A1 | 7/2010 | Rinehart et al. | |
| 2010/0206614 A1 | 8/2010 | Park et al. | |
| 2010/0214214 A1 | 8/2010 | Corson et al. | |
| 2010/0214257 A1 | 8/2010 | Wussler et al. | |
| 2010/0222110 A1 | 9/2010 | Kim et al. | |
| 2010/0231498 A1 | 9/2010 | Large et al. | |
| 2010/0231510 A1 | 9/2010 | Sampsell et al. | |
| 2010/0231556 A1 | 9/2010 | Mines et al. | |

(56) References Cited

U.S. PATENT DOCUMENTS

| | | |
|---|---|---|
| 2010/0238138 A1 | 9/2010 | Goertz et al. |
| 2010/0245289 A1* | 9/2010 | Svajda .................... 345/175 |
| 2010/0250988 A1 | 9/2010 | Okuda et al. |
| 2010/0274932 A1 | 10/2010 | Kose |
| 2010/0279768 A1 | 11/2010 | Huang et al. |
| 2010/0289457 A1 | 11/2010 | Onnerud et al. |
| 2010/0295812 A1 | 11/2010 | Burns et al. |
| 2010/0299642 A1* | 11/2010 | Merrell et al. ............ 715/863 |
| 2010/0302378 A1 | 12/2010 | Marks et al. |
| 2010/0304793 A1 | 12/2010 | Kim |
| 2010/0306538 A1 | 12/2010 | Thomas et al. |
| 2010/0308778 A1 | 12/2010 | Yamazaki et al. |
| 2010/0308844 A1 | 12/2010 | Day et al. |
| 2010/0315348 A1 | 12/2010 | Jellicoe et al. |
| 2010/0321339 A1 | 12/2010 | Kimmel |
| 2010/0321482 A1 | 12/2010 | Cleveland |
| 2010/0322479 A1 | 12/2010 | Cleveland |
| 2010/0325155 A1 | 12/2010 | Skinner et al. |
| 2010/0331059 A1 | 12/2010 | Apgar et al. |
| 2011/0012873 A1 | 1/2011 | Prest et al. |
| 2011/0019123 A1 | 1/2011 | Prest et al. |
| 2011/0031287 A1 | 2/2011 | Le Gette et al. |
| 2011/0037721 A1 | 2/2011 | Cranfill et al. |
| 2011/0043142 A1 | 2/2011 | Travis |
| 2011/0043990 A1 | 2/2011 | Mickey et al. |
| 2011/0044582 A1 | 2/2011 | Travis et al. |
| 2011/0060926 A1 | 3/2011 | Brooks et al. |
| 2011/0069148 A1 | 3/2011 | Jones et al. |
| 2011/0074688 A1 | 3/2011 | Hull et al. |
| 2011/0102326 A1 | 5/2011 | Casparian et al. |
| 2011/0102356 A1 | 5/2011 | Kemppinen et al. |
| 2011/0115747 A1 | 5/2011 | Powell et al. |
| 2011/0134032 A1 | 6/2011 | Chiu et al. |
| 2011/0134112 A1 | 6/2011 | Koh et al. |
| 2011/0163955 A1 | 7/2011 | Nasiri et al. |
| 2011/0164370 A1 | 7/2011 | McClure et al. |
| 2011/0167181 A1 | 7/2011 | Minoo et al. |
| 2011/0167287 A1 | 7/2011 | Walsh et al. |
| 2011/0167391 A1 | 7/2011 | Momeyer et al. |
| 2011/0167992 A1 | 7/2011 | Eventoff et al. |
| 2011/0179864 A1 | 7/2011 | Raasch et al. |
| 2011/0184646 A1 | 7/2011 | Wong et al. |
| 2011/0193787 A1 | 8/2011 | Morishige et al. |
| 2011/0193938 A1 | 8/2011 | Oderwald et al. |
| 2011/0199389 A1 | 8/2011 | Lu et al. |
| 2011/0202878 A1 | 8/2011 | Park et al. |
| 2011/0205372 A1 | 8/2011 | Miramontes |
| 2011/0216266 A1 | 9/2011 | Travis |
| 2011/0227913 A1 | 9/2011 | Hyndman |
| 2011/0242138 A1 | 10/2011 | Tribble |
| 2011/0242298 A1 | 10/2011 | Bathiche et al. |
| 2011/0248152 A1 | 10/2011 | Svajda et al. |
| 2011/0248920 A1 | 10/2011 | Larsen |
| 2011/0261083 A1 | 10/2011 | Wilson |
| 2011/0262001 A1 | 10/2011 | Bi et al. |
| 2011/0273475 A1 | 11/2011 | Herz et al. |
| 2011/0290686 A1 | 12/2011 | Huang |
| 2011/0295697 A1 | 12/2011 | Boston et al. |
| 2011/0297566 A1 | 12/2011 | Gallagher et al. |
| 2011/0304577 A1 | 12/2011 | Brown |
| 2011/0316807 A1 | 12/2011 | Corrion |
| 2012/0007821 A1 | 1/2012 | Zaliva |
| 2012/0011462 A1 | 1/2012 | Westerman et al. |
| 2012/0019165 A1 | 1/2012 | Igaki et al. |
| 2012/0020112 A1 | 1/2012 | Fisher et al. |
| 2012/0023459 A1 | 1/2012 | Westerman |
| 2012/0024682 A1 | 2/2012 | Huang et al. |
| 2012/0044179 A1 | 2/2012 | Hudson |
| 2012/0047368 A1 | 2/2012 | Chinn et al. |
| 2012/0050975 A1 | 3/2012 | Garelli et al. |
| 2012/0075249 A1 | 3/2012 | Hoch |
| 2012/0081316 A1 | 4/2012 | Sirpal et al. |
| 2012/0092279 A1 | 4/2012 | Martin |
| 2012/0094257 A1 | 4/2012 | Pillischer et al. |
| 2012/0099749 A1 | 4/2012 | Rubin et al. |
| 2012/0117409 A1 | 5/2012 | Lee et al. |
| 2012/0127118 A1 | 5/2012 | Nolting et al. |
| 2012/0127126 A1 | 5/2012 | Mattice et al. |
| 2012/0127573 A1 | 5/2012 | Robinson et al. |
| 2012/0140396 A1 | 6/2012 | Zeliff et al. |
| 2012/0145525 A1 | 6/2012 | Ishikawa |
| 2012/0162693 A1 | 6/2012 | Ito |
| 2012/0182242 A1 | 7/2012 | Lindahl et al. |
| 2012/0188791 A1 | 7/2012 | Voloschenko et al. |
| 2012/0194448 A1 | 8/2012 | Rothkopf |
| 2012/0195063 A1 | 8/2012 | Kim et al. |
| 2012/0200802 A1 | 8/2012 | Large |
| 2012/0206937 A1 | 8/2012 | Travis et al. |
| 2012/0224073 A1 | 9/2012 | Miyahara |
| 2012/0229634 A1 | 9/2012 | Laett et al. |
| 2012/0246377 A1 | 9/2012 | Bhesania |
| 2012/0256829 A1 | 10/2012 | Dodge |
| 2012/0256959 A1 | 10/2012 | Ye et al. |
| 2012/0274811 A1 | 11/2012 | Bakin |
| 2012/0300275 A1 | 11/2012 | Vilardell et al. |
| 2013/0021289 A1 | 1/2013 | Chen et al. |
| 2013/0046397 A1 | 2/2013 | Fadell et al. |
| 2013/0063873 A1 | 3/2013 | Wodrich et al. |
| 2013/0076617 A1 | 3/2013 | Csaszar et al. |
| 2013/0100082 A1 | 4/2013 | Bakin et al. |
| 2013/0106766 A1 | 5/2013 | Yilmaz et al. |
| 2013/0120466 A1 | 5/2013 | Chen et al. |
| 2013/0127980 A1 | 5/2013 | Haddick et al. |
| 2013/0154959 A1 | 6/2013 | Lindsay et al. |
| 2013/0155723 A1 | 6/2013 | Coleman |
| 2013/0172906 A1 | 7/2013 | Olson et al. |
| 2013/0182246 A1 | 7/2013 | Tanase |
| 2013/0207937 A1 | 8/2013 | Lutian |
| 2013/0212483 A1 | 8/2013 | Brakensiek et al. |
| 2013/0222272 A1 | 8/2013 | Martin, Jr. |
| 2013/0222274 A1 | 8/2013 | Mori et al. |
| 2013/0222323 A1 | 8/2013 | McKenzie |
| 2013/0229335 A1 | 9/2013 | Whitman |
| 2013/0232280 A1 | 9/2013 | Perek |
| 2013/0308339 A1 | 11/2013 | Woodgate et al. |
| 2013/0328761 A1 | 12/2013 | Boulanger |
| 2014/0012401 A1 | 1/2014 | Perek |
| 2014/0043275 A1 | 2/2014 | Whitman |
| 2014/0372914 A1 | 12/2014 | Byrd et al. |
| 2014/0379942 A1 | 12/2014 | Perek et al. |
| 2015/0005953 A1 | 1/2015 | Fadell et al. |

FOREIGN PATENT DOCUMENTS

| | | |
|---|---|---|
| CN | 1700072 | 11/2005 |
| CN | 1787605 | 6/2006 |
| CN | 1920642 | 2/2007 |
| CN | 101038401 | 9/2007 |
| CN | 101366001 | 2/2009 |
| CN | 101473167 | 7/2009 |
| CN | 101512403 | 8/2009 |
| CN | 101644979 | 2/2010 |
| CN | 101688991 | 3/2010 |
| CN | 101889225 | 11/2010 |
| CN | 101893785 | 11/2010 |
| EP | 2353978 | 8/2011 |
| GB | 2410116 | 7/2005 |
| GB | 2428101 | 1/2007 |
| JP | H07218865 | 8/1995 |
| JP | H0980354 | 3/1997 |
| JP | H09178949 | 7/1997 |
| JP | H10234057 | 9/1998 |
| JP | 10326124 | 12/1998 |
| JP | 2000106021 | 4/2000 |
| JP | 2002100226 | 4/2002 |
| JP | 2002162912 | 6/2002 |
| JP | 2003215349 | 7/2003 |
| JP | 2004171948 | 6/2004 |
| JP | 2005077437 | 3/2005 |
| JP | 2005156932 | 5/2005 |
| JP | 2005331565 | 12/2005 |
| JP | 2006004877 | 1/2006 |
| JP | 2006278251 | 10/2006 |
| JP | 2006294361 | 10/2006 |

(56) References Cited

FOREIGN PATENT DOCUMENTS

| | | |
|---|---|---|
| JP | 2006310269 | 11/2006 |
| JP | 2007184286 | 7/2007 |
| JP | 2007273288 | 10/2007 |
| JP | 2008066152 | 3/2008 |
| JP | 2008286874 | 7/2008 |
| JP | 2008529251 | 7/2008 |
| JP | 2009059583 | 3/2009 |
| JP | 2010151951 | 7/2010 |
| KR | 20010039013 | 5/2001 |
| KR | 20080009490 | 1/2008 |
| KR | 20080055051 | 6/2008 |
| WO | WO-0128309 | 4/2001 |
| WO | WO-0172037 | 9/2001 |
| WO | WO-03048635 | 6/2003 |
| WO | WO-03083530 | 9/2003 |
| WO | WO-2005059874 | 6/2005 |
| WO | WO-2006044818 | 4/2006 |
| WO | WO-2006082444 | 8/2006 |
| WO | WO-2007094304 | 8/2007 |
| WO | WO-2007123202 | 11/2007 |
| WO | WO-2008013146 | 1/2008 |
| WO | WO-2008038016 | 4/2008 |
| WO | WO-2012174364 | 12/2012 |
| WO | WO-2013033274 | 3/2013 |
| WO | WO-2013163347 | 10/2013 |

OTHER PUBLICATIONS

"Optical Sensors in Smart Mobile Devices", Retrieved at <<http://www.onsemi.jp/pub_link/Collateral/TND415-D.PDF>>, Nov. 2010, pp. 13.

"Directional Backlighting for Display Panels", U.S. Appl. No. 13/021,448, filed Feb. 4, 2011, pp. 38.

"Notice of Allowance", U.S. Appl. No. 13/651,195, (Jul. 8, 2013), 9 pages.

"Non-Final Office Action", U.S. Appl. No. 13/021,448, (Aug. 16, 2013), 25 pages.

"Accessing Device Sensors", retrieved from <https://developer.palm.com/content/api/dev-guide/pdk/accessing-device-sensors.html> on May 25, 2012, 4 pages.

"ACPI Docking for Windows Operating Systems", Retrieved from: <http://www.scritube.com/limba/engleza/software/ACPI-Docking-for-Windows-Opera331824193.php> on Jul. 6, 2012,10 pages.

"Cholesteric Liquid Crystal", Retrieved from: <http://en.wikipedia.org/wiki/Cholesteric_liquid_crystal> on Aug. 6, 2012,(Jun. 10, 2012), 2 pages.

"Cirago Slim Case®—Protective case with built-in kickstand for your iPhone 5®", Retrieved from <http://cirago.com/wordpress/wp-content/uploads/2012/10/ipc1500brochure1.pdf> on Jan. 29, 2013, 1 page.

"DR2PA", retrieved from <http://www.architainment.co.uk/wp-content/uploads/2012/08/DR2PA-AU-US-size-Data-Sheet-Rev-H_LOGO.pdf> on Sep. 17, 2012, 4 pages.

"Final Office Action", U.S. Appl. No. 13/651,195, (Apr. 18, 2013),13 pages.

"First One Handed Fabric Keyboard with Bluetooth Wireless Technology", Retrieved from: <http://press.xtvworld.com/article3817.html> on May 8, 2012,(Jan. 6, 2005), 2 pages.

"Force and Position Sensing Resistors: An Emerging Technology", *Interlink Electronics*, Available at <http://staff.science.uva.nl/~vlaander/docu/FSR/An_Exploring_Technology.pdf>,(Feb. 1990), pp. 1-6.

"Frogpad Introduces Weareable Fabric Keyboard with Bluetooth Technology", Retrieved from: <http://www.geekzone.co.nz/content.asp?contentid=3898> on May 7, 2012,(Jan. 7, 2005),3 pages.

"How to Use the iPad's Onscreen Keyboard", Retrieved from <http://www.dummies.com/how-to/content/how-to-use-the-ipads-onscreen-keyboard.html> on Aug. 28, 2012, 3 pages.

"i-Interactor electronic pen", Retrieved from: <http://www.alibaba.com/product-gs/331004878/i_Interactor_electronic_pen.html> on Jun. 19, 2012, 5 pages.

"Incipio LG G-Slate Premium Kickstand Case—Black Nylon", Retrieved from: <http://www.amazon.com/Incipio-G-Slate-Premium-Kickstand-Case/dp/B004ZKP916> on May 8, 2012, 4 pages.

"Membrane Keyboards & Membrane Keypads", Retrieved from: <http://www.pannam.com/> on May 9, 2012,(Mar. 4, 2009), 2 pages.

"Motion Sensors", *Android Developers*, retrieved from <http://developer.android.com/guide/topics/sensors/sensors_motion.html> on May 25, 2012, 7 pages.

"MPC Fly Music Production Controller", *AKAI Professional*, Retrieved from: <http://www.akaiprompc.com/mpc-fly> on Jul. 9, 2012,4 pages.

"NI Releases New Maschine & Maschine Mikro", Retrieved from <http://www.djbooth.net/index/dj-equipment/entry/ni-releases-new-maschine-mikro/> on Sep. 17, 2012, 19 pages.

"Non-Final Office Action", U.S. Appl. No. 13/471,001, (Feb. 19, 2013),15 pages.

"Non-Final Office Action", U.S. Appl. No. 13/471,139, (Mar. 21, 2013),12 pages.

"Non-Final Office Action", U.S. Appl. No. 13/471,202, (Feb. 11, 2013),10 pages.

"Non-Final Office Action", U.S. Appl. No. 13/471,336, (Jan. 18, 2013),14 pages.

"Non-Final Office Action", U.S. Appl. No. 13/651,195, (Jan. 2, 2013),14 pages.

"Non-Final Office Action", U.S. Appl. No. 13/651,232, (Jan. 17, 2013),15 pages.

"Non-Final Office Action", U.S. Appl. No. 13/651,272, (Feb. 12, 2013),10 pages.

"Non-Final Office Action", U.S. Appl. No. 13/651,287, (Jan. 29, 2013),13 pages.

"Non-Final Office Action", U.S. Appl. No. 13/651,304, (Mar. 22, 2013), 9 pages.

"Non-Final Office Action", U.S. Appl. No. 13/651,327, (Mar. 22, 2013), 6 pages.

"Non-Final Office Action", U.S. Appl. No. 13/651,871, (Mar. 18, 2013),14 pages.

"Non-Final Office Action", U.S. Appl. No. 13/651,976, (Feb. 22, 2013),16 pages.

"Non-Final Office Action", U.S. Appl. No. 13/653,321, (Feb. 1, 2013),13 pages.

"Non-Final Office Action", U.S. Appl. No. 13/653,682, (Feb. 7, 2013),11 pages.

"Notice of Allowance", U.S. Appl. No. 13/470,633, (Mar. 22, 2013), 7 pages.

"Notice of Allowance", U.S. Appl. No. 13/471,202, (May 28, 2013), 7 pages.

"On-Screen Keyboard for Windows 7, Vista, XP with Touchscreen", Retrieved from <www.comfort-software.com/on-screen-keyboard.html> on Aug. 28, 2012, (Feb. 2, 2011), 3 pages.

"Position Sensors", *Android Developers*, retrieved from <http://developer.android.com/guide/topics/sensors/sensors_position.html> on May 25, 2012, 5 pages.

"Reflex LCD Writing Tablets", retrieved from <http://www.kentdisplays.com/products/lcdwritingtablets.html> on Jun. 27, 2012, 3 pages.

"Restriction Requirement", U.S. Appl. No. 13/471,139, (Jan. 17, 2013), 7 pages.

"Restriction Requirement", U.S. Appl. No. 13/651,304, (Jan. 18, 2013), 7 pages.

"Restriction Requirement", U.S. Appl. No. 13/651,726, (Feb. 22, 2013), 6 pages.

"Restriction Requirement", U.S. Appl. No. 13/651,871, (Feb. 7, 2013), 6 pages.

"SMART Board™ Interactive Display Frame Pencil Pack", Available at <http://downloads01.smarttech.com/media/sitecore/en/support/product/sbfpd/400series(interactivedisplayframes)/guides/smartboardinteractivedisplayframepencilpackv12mar09.pdf>,(2009), 2 pages.

"SoIRxTM E-Series Multidirectional Phototherapy ExpandableTM 2-Bulb Full Body Panel System", Retrieved from: < http://www.solarcsystems.com/us_multidirectional_uv_light_therapy_1_intro.html > on Jul. 25, 2012,(2011), 4 pages.

(56) References Cited

OTHER PUBLICATIONS

"The Microsoft Surface Tablets Comes With Impressive Design and Specs", Retrieved from from <http://microsofttabletreview.com/the-microsoft-surface-tablets-comes-with-impressive-design-and-specs> on Jan. 30, 2013, (Jun. 2012), 2 pages.
"Tilt Shift Lenses: Perspective Control", retrieved from http://www.cambridgeincolour.com/tutorials/tilt-shift-lenses1.htm, (Mar. 28, 2008),11 Pages.
"Virtualization Getting Started Guide", *Red Hat Enterprise Linux 6*, Edition 0.2, retrieved from <http://docs.redhat.com/docs/en-US/Red_Hat_Enterprise_Linux/6/html-single/Virtualization_Getting_Started_Guide/index.html> on Jun. 13, 2012, 24 pages.
"What is Active Alignment?", http://www.kasalis.com/active_alignment.html, retrieved on Nov. 22, 2012, 2 Pages.
Block, Steve et al., "DeviceOrientation Event Specification", *W3C*, Editor's Draft, retrieved from <https://developer.palm.com/content/api/dev-guide/pdk/accessing-device-sensors.html> on May 25, 2012,(Jul. 12, 2011), 14 pages.
Brown, Rich "Microsoft Shows Off Pressure-Sensitive Keyboard", retrieved from <http://news.cnet.com/8301-17938_105-10304792-1.html> on May 7, 2012, (Aug. 6, 2009), 2 pages.
Butler, Alex et al., "SideSight: Multi-"touch" Interaction around Small Devices", *In the proceedings of the 21st annual ACM symposium on User interface software and technology.*, retrieved from <http://research.microsoft.com/pubs/132534/sidesight_crv3.pdf> on May 29, 2012,(Oct. 19, 2008), 4 pages.
Crider, Michael "Sony Slate Concept Tablet "Grows" a Kickstand", Retrieved from: <http://androidcommunity.com/sony-slate-concept-tablet-grows-a-kickstand-20120116/> on May 4, 2012,(Jan. 16, 2012), 9 pages.
Das, Apurba et al., "Study of Heat Transfer through Multilayer Clothing Assemblies: A Theoretical Prediction", Retrieved from <http://www.autexrj.com/cms/zalaczone_pliki/5_013_11.pdf>, (Jun. 2011), 7 pages.
Dietz, Paul H., et al., "A Practical Pressure Sensitive Computer Keyboard", In Proceedings of UIST 2009,(Oct. 2009), 4 pages.
Gaver, William W., et al., "A Virtual Window on Media Space", retrieved from <http://www.gold.ac.uk/media/15gaver-smets-overbeeke.MediaSpaceWindow.chi95.pdf> on Jun. 1, 2012, retrieved from <http://www.gold.ac.uk/media/15gaver-smets-overbeeke.MediaSpaceWindow.chi95.pdf> Jun. 1, 2012,(May 7, 1995), 9 pages.
Glatt, Jeff "Channel and Key Pressure (Aftertouch).", Retrieved from: <http://home.roadrunner.com/~jgglatt/tutr/touch.htm> on Jun. 11, 2012, 2 pages.
Hanlon, Mike "ElekTex Smart Fabric Keyboard Goes Wireless", Retrieved from: <http://www.gizmag.com/go/5048/> on May 7, 2012,(Jan. 15, 2006), 5 pages.
Harada, Susumu et al., "VoiceDraw: A Hands-Free Voice-Driven Drawing Application for People With Motor Impairments", *In Proceedings of Ninth International ACM SIGACCESS Conference on Computers and Accessibility*, retrieved from <http://citeseerx.ist.psu.edu/viewdoc/download?doi=10.1.1.113.7211&rep=rep1&type=pdf > on Jun. 1, 2012,(Oct. 15, 2007), 8 pages.
Iwase, Eiji "Multistep Sequential Batch Assembly of Three-Dimensional Ferromagnetic Microstructures with Elastic Hinges", Retrieved at <<http://ieeexplore.ieee.org/stamp/stamp.jsp?tp=& arnumber=1549861>> Proceedings: *Journal of Microelectromechanical Systems*, (Dec. 2005), 7 pages.
Kaufmann, Benoit et al., "Hand Posture Recognition Using Real-time Artificial Evolution", *EvoApplications'09*, retrieved from <http://evelyne.lutton.free.fr/Papers/KaufmannEvolASP2010.pdf> on Jan. 5, 2012,(Apr. 3, 2010), 10 pages.
Kaur, Sukhmani "Vincent Liew's redesigned laptop satisfies ergonomic needs", Retrieved from: <http://www.designbuzz.com/entry/vincent-liew-s-redesigned-laptop-satisfies-ergonomic-needs/> on Jul. 27, 2012,(Jun. 21, 2010), 4 pages.
Khuntontong, Puttachat et al., "Fabrication of Molded Interconnection Devices by Ultrasonic Hot Embossing on Thin Polymer Films", IEEE Transactions on Electronics Packaging Manufacturing, vol. 32, No. 3,(Jul. 2009), pp. 152-156.
Linderholm, Owen "Logitech Shows Cloth Keyboard for PDAs", Retrieved from: <http://www.pcworld.com/article/89084/logitech_shows_cloth_keyboard_for_pdas.html> on May 7, 2012,(Mar. 15, 2002), 5 pages.
Manresa-Yee, Cristina et al., "Experiences Using a Hands-Free Interface", *In Proceedings of the 10th International ACM SIGACCESS Conference on Computers and Accessibility*, retrieved from <http://dmi.uib.es/~cmanresay/Research/%5BMan08%5DAssets08.pdf> on Jun. 1, 2012,(Oct. 13, 2008), pp. 261-262.
McLellan, Charles "Eleksen Wireless Fabric Keyboard: a first look", Retrieved from: <http://www.zdnetasia.com/eleksen-wireless-fabric-keyboard-a-first-look-40278954.htm> on May 7, 2012,(Jul. 17, 2006), 9 pages.
Nakanishi, Hideyuki et al., "Movable Cameras Enhance Social Telepresence in Media Spaces", *In Proceedings of the 27th International Conference on Human Factors in Computing Systems*, retrieved from <http://smg.ams.eng.osaka-u.ac.jp/~nakanishi/hnp_2009_chi.pdf> on Jun. 1, 2012,(Apr. 6, 2009),10 pages.
Piltch, Avram "ASUS Eee Pad Slider SL101 Review ", Retrieved from <http://www.laptopmag.com/review/tablets/asus-eee-pad-slider-sl101.aspx>, (Sep. 22, 2011), 5 pages.
Post, E.R. et al., "E-Broidery: Design and Fabrication of Textile-Based Computing", IBM Systems Journal, vol. 39, Issue 3 & 4,(Jul. 2000), pp. 840-860.
Purcher, Jack "Apple is Paving the Way for a New 3D GUI for IOS Devices", Retrieved from: <http://www.patentlyapple.com/patently-apple/2012/01/apple-is-paving-the-way-for-a-new-3d-gui-for-ios-devices.html> on Jun. 4, 2012,(Jan. 12, 2012),15 pages.
Qin, Yongqiang et al., "pPen: Enabling Authenticated Pen and Touch Interaction on Tabletop Surfaces", *In Proceedings of ITS 2010*, Available at <http://www.dfki.de/its2010/papers/pdf/po172.pdf>,(Nov. 2010), pp. 283-284.
Reilink, Rob et al., "Endoscopic Camera Control by Head Movements for Thoracic Surgery", *In Proceedings of 3rd IEEE RAS & EMBS International Conference of Biomedical Robotics and Biomechatronics*, retrieved from <http://doc.utwente.nl/74929/1/biorob_online.pdf> Jun. 1, 2012,(Sep. 26, 2010), pp. 510-515.
Sumimoto, Mark "Touch & Write: Surface Computing With Touch and Pen Input", Retrieved from: <http://www.gottabemobile.com/2009/08/07/touch-write-surface-computing-with-touch-and-pen-input/> on Jun. 19, 2012,(Aug. 7, 2009), 4 pages.
Sundstedt, Veronica "Gazing at Games: Using Eye Tracking to Control Virtual Characters", *In ACM SIGGRAPH 2010 Courses*, retrieved from <http://www.tobii.com/Global/Analysis/Training/EyeTrackAwards/veronica_sundstedtpdf> on Jun. 1, 2012,(Jul. 28, 2010), 85 pages.
Takamatsu, Seiichi et al., "Flexible Fabric Keyboard with Conductive Polymer-Coated Fibers", In Proceedings of Sensors 2011,(Oct. 28, 2011), 4 pages.
Valli, Alessandro "Notes on Natural Interaction", retrieved from <http://www.idemployee.id.tue.nl/g.w.m.rauterberg/lecturenotes/valli-2004.pdf> on Jan. 5, 2012,(Sep. 2005), 80 pages.
Valliath, G T., "Design of Hologram for Brightness Enhancement in Color LCDs", Retrieved from <http://www.loreti.it/Download/PDF/LCD/44_05.pdf> on Sep. 17, 2012, 5 pages.
Vaucell, Cati "Scopemate, A Robotic Microscope!", *Architectradure*, retrieved from <http://architectradure.blogspot.com/2011/10/at-uist-this-monday-scopemate-robotic.html> on Jun. 6, 2012,(Oct. 17, 2011), 2 pages.
Williams, Jim "A Fourth Generation of LCD Backlight Technology", Retrieved from <http://cds.linear.com/docs/Application%20Note/an65f.pdf>, (Nov. 1995), 124 pages.
Xu, Zhang et al., "Hand Gesture Recognition and Virtual Game Control Based on 3D Accelerometer and EMG Sensors", *IUI'09*, Feb. 8-11, 2009, retrieved from <http://sclab.yonsei.ac.kr/courses/10TPR/10TPR.files/Hand%20Gesture%20Recognition%20and%20Virtual%20Game%20Control%20based%20on%203d%20accelerometer%20and%20EMG%20sensors.pdf> on Jan. 5, 2012,(Feb. 8, 2009), 5 pages.

(56) References Cited

OTHER PUBLICATIONS

Xu, Zhi-Gang et al., "Vision-based Detection of Dynamic Gesture", *ICTM'09*, Dec. 5-6, 2009, retrieved from <http://ieeexplore.ieee.org/stamp/stamp.jsp?tp=&arnumber=5412956> on Jan. 5, 2012,(Dec. 5, 2009), pp. 223-226.

Zhang, et al., "Model-Based Development of Dynamically Adaptive Software", *In Proceedings of ICSE 2006*, Available at <http://www.irisa.fr/lande/lande/icse-proceedings/icse/p371.pdf>,(May 20, 2006), pp. 371-380.

Zhu, Dingyun et al., "Keyboard before Head Tracking Depresses User Success in Remote Camera Control", *In Proceedings of 12th IFIP TC 13 International Conference on Human-Computer Interaction*, Part II, retrieved from <http://csiro.academia.edu/Departments/CSIRO_ICT_Centre/Papers?page=5> Jun. 1, 2012,(Aug. 24, 2009), 14 pages.

"Optics for Displays: Waveguide-based Wedge Creates Collimated Display Backlight", *OptoIQ*, retrieved from <http://www.optoiq.com/index/photonics-technologies-applications/lfw-display/lfw-article-display.articles.laser-focus-world.volume-46.issue-1.world-news.optics-for_displays.html> on Nov. 2, 2010,(Jan. 1, 2010),3 pages.

Travis, Adrian et al., "Collimated Light from a Waveguide for a Display Backlight", *Optics Express*, 19714, vol. 17, No. 22, retrieved from <http://download.microsoft.com/download/D/2/E/D2E425F8-CF3C-4C71-A4A2-70F9D4081007/OpticsExpressbacklightpaper.pdf> on Oct. 15, 2009,6 pages.

Travis, Adrian et al., "The Design of Backlights for View-Sequential 3D", retrieved from <http://download.microsoft.com/download/D/2/E/D2E425F8-CF3C-4C71-A4A2-70F9D4081007/Backlightforviewsequentialautostereo.docx> on Nov. 1, 2010,4 pages.

"Non-Final Office Action", U.S. Appl. No. 13/021,448, (Dec. 13, 2012), 9 pages.

"International Search Report and Written Opinion", Application No. PCT/US2013/043961, Oct. 17, 2013, 11 pages.

"Non-Final Office Action", U.S. Appl. No. 13/371,725, Nov. 7, 2013, 19 pages.

"International Search Report", Application No. PCT/US2010/045676, Apr. 28, 2011, 2 Pages.

"International Search Report", Application No. PCT/US2010/046129, Mar. 2, 2011, 3 Pages.

"What is the PD-Net Project About?", retrieved from <http://pd-net.org/about/> on Mar. 10, 2011, 3 pages.

"Real-Time Television Content Platform", retrieved from <http://www.accenture.com/us-en/pages/insight-real-time-television-platform.aspx> on Mar. 10, 2011, May 28, 2002, 3 pages.

"International Search Report and Written Opinion", Application No. PCT/US2013/055679, Nov. 18, 2013, 8 pages.

Kim et al.,"A Controllable Viewing Angle LCD with an Optically isotropic liquid crystal", Journal of Physics D: Applied Physics, vol. 43, No. 14, Mar. 23, 2010, 7 Pages.

Lee, "Flat-panel Backlight for View-sequential 3D Display", Optoelectronics, IEE Proceedings-.vol. 151. No. 6 IET, Dec. 2004, 4 pages.

Travis, et al., "'Flat Projection for 3-D", In Proceedings of the IEEE, vol. 94 Issue: 3, Available at <http://ieeexplore.ieee.org/stamp/stamp.jsp?tp=&arnumber=1605201>,Mar. 13, 2006, pp. 539-549.

Travis, et al., "'P-127: Linearity in Flat Panel Wedge Projection", SID 03 Digest, retrieved from <http://www2.eng.cam.ac.uk/~arlt1/Linearity%20in%20flat%20panel%20wedge%20projection.pdf>,May 12, 2005, pp. 716-719.

Yagi, "The Concept of "AdapTV"", Series: The Challenge of "AdapTV", Broadcast Technology, No. 28, 2006, pp. 16-17.

"Final Office Action", U.S. Appl. No. 13/021,448, Jan. 16, 2014, 33 Pages.

"Final Office Action", U.S. Appl. No. 13/371,725, Apr. 2, 2014, 22 pages.

"Non-Final Office Action", U.S. Appl. No. 13/494,651, Feb. 4, 2014, 15 pages.

"Corrected Notice of Allowance", U.S. Appl. No. 13/494,651, Oct. 24, 2014, 2 pages.

"EP Search Report", EP Application No. 09812072.8, Apr. 5, 2012, 6 Pages.

"Final Office Action", U.S. Appl. No. 13/494,651, Jun. 11, 2014, 19 pages.

"Foreign Office Action", CN Application No. 200980134848, May 13, 2013, 7 Pages.

"Foreign Office Action", CN Application No. 200980134848, May 31, 2012, 7 Pages.

"Foreign Office Action", CN Application No. 200980134848, Dec. 4, 2013, 8 Pages.

"Foreign Office Action", CN Application No. 200980134848, Dec. 19, 2012, 8 Pages.

"Foreign Office Action", CN Application No. 201080037117.7, Jul. 1, 2014, 9 Pages.

"Foreign Office Action", CN Application No. 201210023945.6, Jun. 25, 2014, 6 Pages.

"Foreign Office Action", JP Application No. 2011-526118, Aug. 16, 2013, 8 Pages.

"Foreign Office Action", JP Application No. 2012-525632, May 2, 2014, 10 Pages.

"Foreign Office Action", JP Application No. 2012-525722, Apr. 22, 2014, 15 pages.

"International Search Report and Written Opinion", Application No. PCT/US2009/055250, Mar. 2, 2014, 10 Pages.

"International Search Report and Written Opinion", Application No. PCT/US2013/028488, Jun. 24, 2014, 11 pages.

"Non-Final Office Action", U.S. Appl. No. 13/021,448, Jul. 22, 2014, 35 pages.

"Non-Final Office Action", U.S. Appl. No. 13/371,725, Nov. 3, 2014, 27 pages.

"Notice of Allowance", U.S. Appl. No. 13/494,651, Oct. 2, 2014, 4 pages.

"Notice of Allowance", U.S. Appl. No. 14/018,286, May 23, 2014, 8 pages.

"Search Report", EP Application No. 09812072.8, Apr. 17, 2013, 5 Pages.

"Supplemental Notice of Allowance", U.S. Appl. No. 14/018,286, Jun. 11, 2014, 5 pages.

Boual, et al., "Wedge Displays as Cameras", Retrieved From: http://www.camfpd.com/72-3.pdf, SID Symposium Digest of Technical Papers, vol. 37, Issue 1, pp. 1999-2002, Jun. 2006, 4 Pages.

Chen, et al., "'Design of a Novel Hybrid Light Guide Plate for Viewing Angle Switchable Backlight Module", Institute of Photonic Systems, Ntional Chiao Tung University, Tainan, Taiwan., Jul. 1, 2013, 4 Pages.

Chou, et al., "'Imaging and Chromatic Behavior Analysis of a Wedge-Plate Display", Retrieved From: http://www.di.nctu.edu.tw/2006TDC/papers/Flexible/06-012.doc, SID Symposium Digest of Technical Papers vol. 37, Issue 1, pp. 1031-1034,Jun. 2006, 4 Pages.

Ishida, et al., "'A Novel Ultra Thin Backlight System without Optical Sheets Using a Newly Developed Multi-Layered Light-guide", SID 10 Digest, Jul. 5, 2012, 4 Pages.

Nishizawa, et al., "'Investigation of Novel Diffuser Films for 2D Light-Distribution Control", Tohoku University, Aramaki Aoba, Aoba-ku, Sendai 980-8579, Japan, LINTEC Corporation, 23-23 Honcho, Itabashi-ku, Tokyo 173-0001, Japan., Dec. 2011, 4 Pages.

Phillips, et al., "Links Between Holography and Lithography", Fifth International Symposium on Display Holography, 206., Feb. 17, 1995, 9 Pages.

Powell, "High-Efficiency Projection Screen", U.S. Appl. No. 14/243,501, Apr. 2, 2014, 26 Pages.

Travis, "P-60: LCD Smear Elimination by Scanning Ray Angle into a Light Guide", Retrieved From: http://www2.eng.cam.ac.uk/~arlt1/P_60.pdf, SID Symposium Digest of Technical Papers vol. 35, Issue 1, pp. 474-477, May 2004, 4 Pages.

Travis, et al., "Optical Design of a Flat Panel Projection Wedge Display", 9th International Display Workshops, paper FMC6-3, Dec. 4-6, 2002, Hiroshima, Japan., Dec. 2002, 4 Pages.

"Final Office Action", U.S. Appl. No. 13/371,725, Mar. 3, 2015, 30 pages.

(56) References Cited

OTHER PUBLICATIONS

"Foreign Office Action", CN Application No. 201080037117.7, Aug. 20, 2013, 10 pages.
"Foreign Office Action", CN Application No. 201210023945.6, Dec. 3, 2013, 13 pages.
"Non-Final Office Action", U.S. Appl. No. 14/059,280, Mar. 3, 2015, 18 pages.
"Corrected Notice of Allowance", U.S. Appl. No. 13/494,651, Dec. 29, 2014, 2 pages.
"Final Office Action", U.S. Appl. No. 13/021,448, Jan. 2, 2015, 19 pages.
"First Examination Report", NZ Application No. 628690, Nov. 27, 2014, 2 pages.
"Advisory Action", U.S. Appl. No. 14/059,280, Sep. 25, 2015, 7 pages.
"Corrected Notice of Allowance", U.S. Appl. No. 13/021,448, Aug. 17, 2015, 2 pages.
"Extended European Search Report", EP Application No. 12800433.0, Oct. 28, 2014, 10 pages.
"Extended European Search Report", EP Application No. 13859406.4, Sep. 8, 2015, 6 pages.
"Final Office Action", U.S. Appl. No. 14/059,280, Jul. 22, 2015, 25 pages.
"Foreign Office Action", CN Application No. 201280029520.4, Jun. 30, 2015, 11 pages.
"Foreign Office Action", JP Application No. 2012-525722, Aug. 13, 2014, 17 pages.
"International Search Report and Written Opinion", Application No. PCT/US2014/066248, Mar. 12, 2015, 10 pages.
"Notice of Allowance", U.S. Appl. No. 13/021,448, Jul. 30, 2015, 11 pages.
"Restriction Requirement", U.S. Appl. No. 13/598,898, Jul. 17, 2015, 6 pages.
"Foreign Office Action", CN Application No. 201310067592.4, Oct. 23, 2015, 12 Pages.
"Foreign Office Action", CN Application No. 201310067622.1, Oct. 27, 2015, 14 pages.
"Non-Final Office Action", U.S. Appl. No. 13/598,898, Oct. 23, 2015, 18 pages.
"Notice of Allowance", U.S. Appl. No. 14/059,280, Nov. 23, 2015, 9 pages.

\* cited by examiner

OBJECT-DETECTING BACKLIGHT UNIT

BACKGROUND

Display devices, such as televisions, laptop computers, tablet computers, and smart phones, may use a modulating display panel, such as a liquid crystal display, in combination with a backlight to display images to users. Increasingly, users want to use display devices that are interactive, such as devices equipped with touchscreen surfaces or cameras that capture user gestures. However, the region near, or just in front of, the display is not covered by touchscreen devices or cameras. For example, typical touchscreen devices capture data when the user physically touches, or is inherently close to touching, the display. Cameras, on the other hand, typically do not have a field of view that is wide enough to capture objects or user gestures close to the display. In addition, hardware costs may prohibit manufacturers from equipping some display devices, such as televisions, with a touchscreen or a camera.

SUMMARY

This document describes techniques and apparatuses for implementing an object-detecting backlight unit for a display device. An object-detecting backlight unit includes two or more light sources configured to provide light to a display to form an image, and a light sensor configured to receive reflected light when an object is near the display and determine that the reflected light originated from a region of the display. The reflected light is caused by light from the image reflecting off of the object back towards the display. The backlight unit is configured to detect a position of the object based on the region of the display from which the reflected light originated.

This summary is provided to introduce simplified concepts in a simplified form that are further described below in the Detailed Description. This summary is not intended to identify essential features of the claimed subject matter, nor is it intended for use in determining the scope of the claimed subject matter.

BRIEF DESCRIPTION OF THE DRAWINGS

Embodiments of techniques and apparatuses for implementing an object-detecting backlight unit are described with reference to the following drawings. The same numbers are used throughout the drawings to reference like features and components.

DETAILED DESCRIPTION

Overview

As described above, users increasingly want to use display devices that are interactive, such as devices with touchscreen surfaces or cameras that capture user gestures. However, the region just in front of the display is not covered by touchscreen devices or cameras. For example, typical touchscreen devices capture data when the user physically touches, or is inherently close to touching, the display. Cameras, on the other hand, typically do not have a field of view that is wide enough to capture objects or gestures close to the display.

In a liquid crystal display (LCD), as commonly used in personal computers and televisions, light that passes through the LCD to form an image on the screen for the viewer is provided by a backlight unit. This document describes an object-detecting backlight unit that enhances the performance of backlight units for display devices. As described in more detail below, the object-detecting backlight unit is able to detect a position of an object near the display, as well as user gestures, such as swipes or wipes, near the display. In some embodiments, the object-detecting backlight unit is able to perform these tasks without modifying existing backlight units with any additional active components. Thus, unlike touchscreen displays which often require manufacturers to make the entire screen a touchscreen and add a digitizer to the device, manufacturers can modify conventional display devices with the object-detecting backlight unit without incurring additional hardware costs. In addition, the object-detecting backlight unit has low power and low processing overheads as compared with, for example, driving a camera and processing its output.

This document describes techniques and apparatuses for implementing an object-detecting backlight unit for a display device. An object-detecting backlight unit includes two or more light sources configured to provide light to a display to form an image, and a light sensor configured to receive reflected light when an object is near the display and determine that the reflected light originated from a region of the display. The reflected light is caused by light from the image reflecting off of the object back towards the display. The backlight unit is configured to detect a position of the object based on the region of the display from which the reflected light originated.

Example Environment

Figure 1:
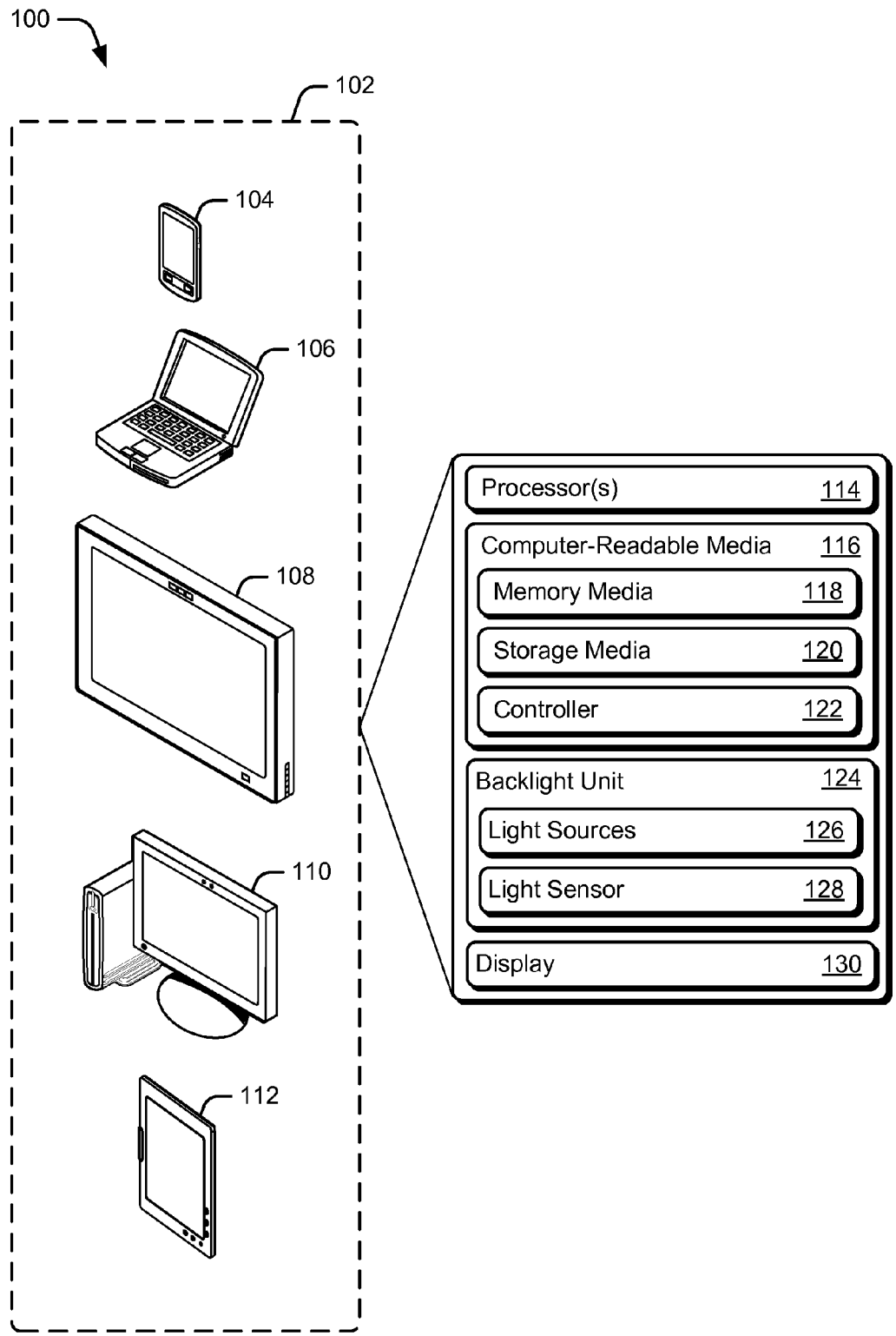
FIG. 1 illustrates an example environment in which an object-detecting backlight unit can be implemented.

FIG. 1 is an illustration of an example environment 100 in which an object-detecting backlight unit can be implemented. Environment 100 includes a display device 102, which is illustrated, by way of example and not limitation, as one of a smart phone 104, a laptop computer 106, a television device 108, a desktop computer 110, or a tablet computer 112.

Display device 102 includes processor(s) 114 and computer-readable media 116, which includes memory media 118 and storage media 120. Applications and/or an operating system (not shown) embodied as computer-readable instructions on computer-readable media 116 can be executed by processor(s) 114 to provide some or all of the functionalities described herein. Computer-readable media also includes controller 122. How controller 122 is implemented and used varies, and is described in further detail below.

Display device 102 also includes a backlight unit 124, which includes multiple light sources 126 and a light sensor 128. Light sources 126 are configured to inject light through a display 130 to form an image for viewing, such as a two-dimensional image, a three-dimensional image, or a multi-view image. In various embodiments, display 130 may be configured as a high resolution, flat-panel electronic display, such as a high-resolution liquid crystal display (LCD). An LCD is an electronically modulated optical device composed of liquid crystal display pixels positioned in front of a backlight unit to produce images.

Light sources 126 may include, by way of example and not limitation, light-emitting diodes (LEDs), compact cylindrical fluorescent light sources (CCFL), or any other type of light source configured for use in a display device. The number of light sources 126 may vary from two to four light sources for small display devices such as mobile phones, to 100 or more light sources for large display devices such as computer monitors or televisions. The output of backlight unit 124 can be controlled by either DC current control or by pulse-width modulation of light sources 126. Light sources 126 can be arranged electrically in combinations of series and parallel based on the power supply availability of display device 102.

Light sensor 128 is configured to detect light, such as light that originates from one of light sources 126, passes through display 130 to form an image for viewing, and is reflected back towards display 130 by an object near the display. In an embodiment, light sensor 128 is an ambient light detector that enables the brightness of display 130 to be controlled in proportion to external lighting conditions. An ambient light detector can be implemented as a single or dual silicon photodiode with subsequent signal conditioning.

As described in more detail below, backlight unit 124 is configured to detect a position of an object near the display without the use of a touchscreen or a camera. As described herein, an object is "near" the display if the object is positioned in front of the display, or if the object is positioned close enough to the display to be able to reflect light from the display back towards the display. In some embodiments, display device 102 may be configured with one or both of a touchscreen and a camera, and backlight unit 124 is configured to detect a position of objects near the display that are not physically touching the display and are too close to the display to be captured by the camera. In other embodiments, however, display device 102 may not be configured with either a touchscreen or a camera.

Figure 2:
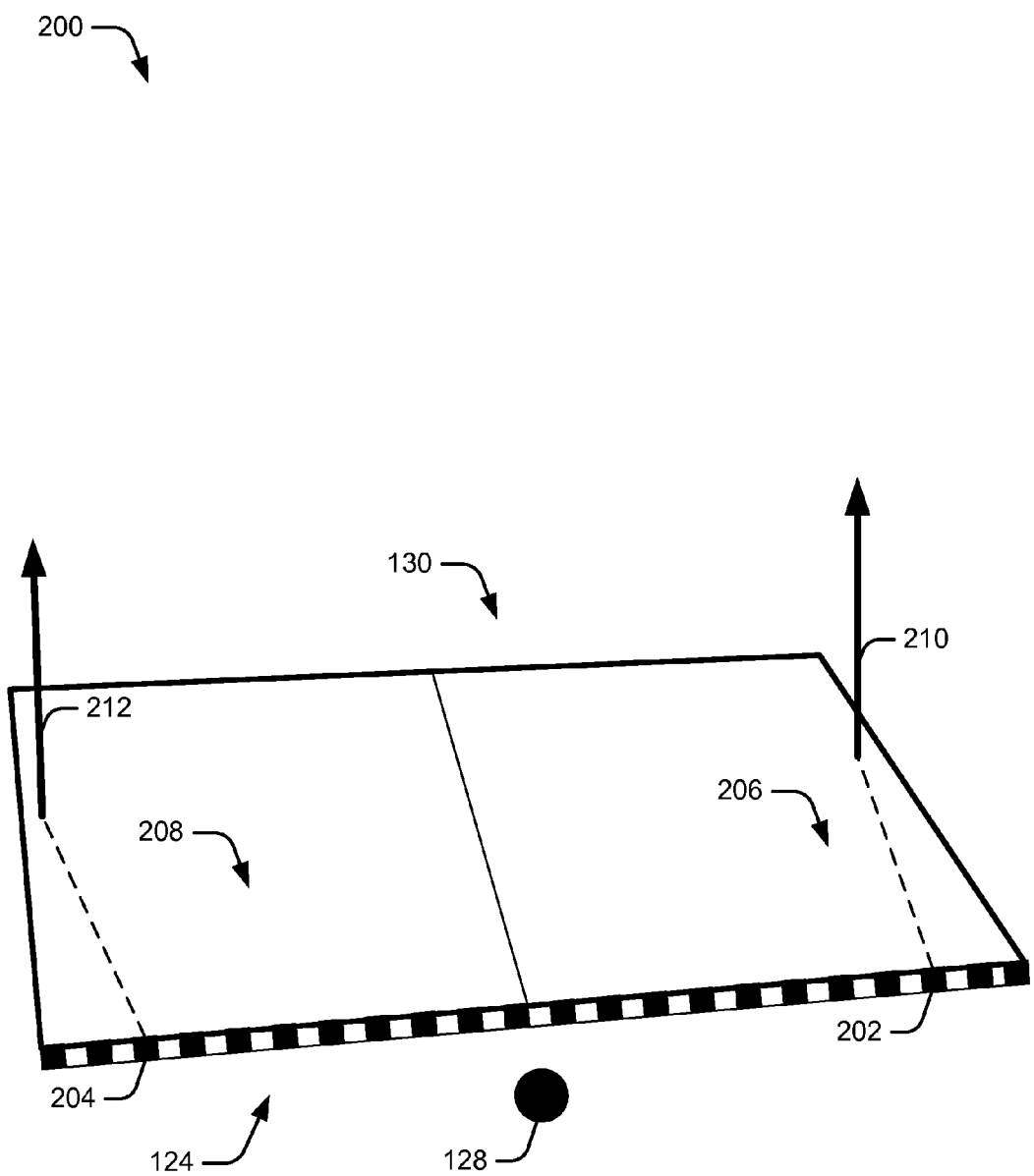
FIG. 2 illustrates a detailed example of an object-detecting backlight unit and a display.

FIG. 2 illustrates a detailed example 200 of backlight unit 124 and display 130. In this example, display 130 is oriented horizontally. Alternately, however, display 130 may be oriented vertically, such as a screen of a typical television device. In this example, backlight unit 124 is configured with multiple light sources, two of which are identified as a first light source 202 and second light source 204, positioned along the base of display 130. It is to be noted, however, that backlight unit may be implemented with 100 or more light sources. Backlight unit 124 may use a variety of different configurations of light sources, such as a row of light sources positioned along the top of display 130, a row of light sources positioned along the top and the base of display 130, or a row of light sources positioned on the left and right sides of display 130.

In this example, first light source 202 is associated with a first region 206 on the right side of display 130, and second light source 204 is associated with a second region 208 on the left side of display 130. As described herein, a "region" can refer to any area on display 130, such as a right region of the display, a middle region of the display, a left region of the display, a top region of the display, or a bottom region of the display, to name just a few. A light source is considered to be "associated" with a particular region of display 130 if the light source projects light principally from that particular region of the display and/or if the light source is positioned in that particular region of the display.

In some embodiments, for example, backlight unit 124 is configured such that light from each light source emerges from the display in a way that approximately preserves the spatial distribution of each light source. In other words, light from the left-most light sources is principally projected from the left side of the display and light from the right-most light sources is principally projected from the right side of the display. In other embodiments, however, the light projected by each light source may be scrambled and diffused inside backlight unit 124 so as to make display 130 uniform in brightness. Such scrambling and diffusing, however, may cause light projected from one or more light sources on a left side of the display to be projected on the right side of the display, or vice versa. However, despite the scrambling and diffusing, a majority of the light projected on the left side of display will be from the light sources on the left side of the display, and a majority of the light projected on the right side of display will be from the light sources on the right side of display.

Continuing with example 200, display 130 receives light from first light source 202 and light from second light source 204. Display 130 then forms an image for viewing by projecting light 210 from first light source 202 out of first region 206 of display 130 and projecting light 212 from second light source 204 out of second region 208 of display 130.

Figure 3:
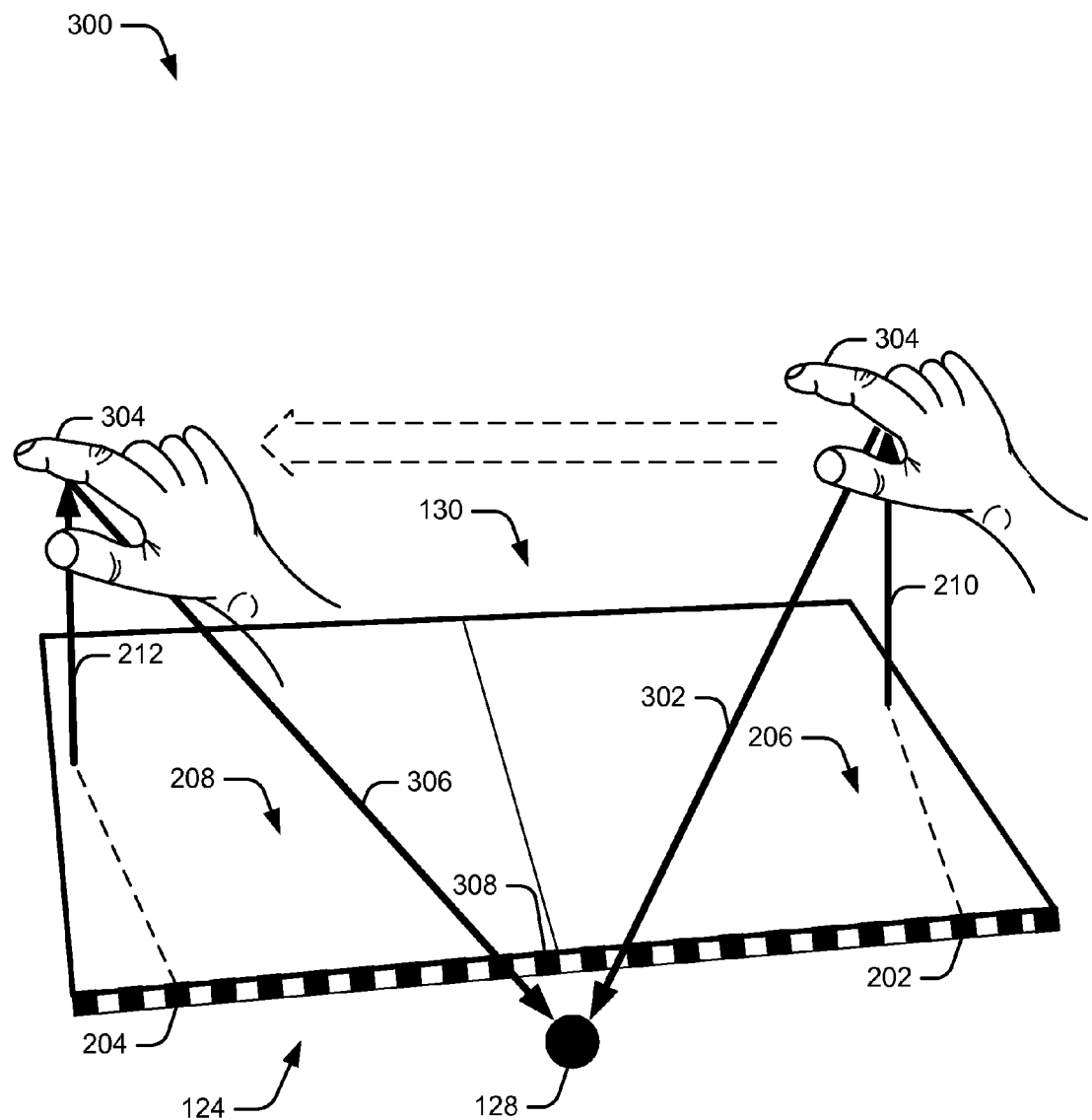
FIG. 3 illustrates another detailed example of an object-detecting backlight unit and a display.

FIG. 3 illustrates another detailed example 300 of backlight unit 124 and display 130. In this example, light 210 is reflected back towards display 130 as reflected light 302 when light 210 contacts an object 304, which in this case is a user's hand. Light sensor 128 receives reflected light 302, and backlight unit 124 determines whether reflected light 302 originated from first region 206 or second region 208 of display 130. It is to be noted that in conventional backlight units systems, the light sensor cannot discriminate between light that originated from different light sources or different regions of the display.

In accordance with various embodiments, to detect a position of objects positioned near the display, the output of at least two light sources of the backlight unit, each associated with a different region of the display, are modulated with different modulation functions. For instance, the output of at least two light sources can be modulated with sine waves with different frequencies. In this example, first light source 202 is modulated at a first frequency and second light source 204 is modulated at a second frequency. The frequencies can be invisible to the human eye (e.g., faster than 60 Hz). Further, the first frequency and the second frequency may be separated in frequency large enough to permit integration of the output with a time constant that is short compared with a likely speed of human interaction events, such as user's hand moving from one side of the display to the other to form a page-turn gesture. Light sensor 128 is configured to identify the light source or the region of the display from which the reflected light originated by demodulating the reflected light and comparing a frequency of the reflected light to the frequencies associated with the various light sources and regions of the display.

In an embodiment, backlight unit 124 may use an analog modulation scheme to modulate the light sources. Such modulation schemes are well known, and are not discussed in detail herein. In another embodiment, such as for cases where a large number of light sources are to be modulated, backlight unit 124 may use a digital modulation scheme in which each light source is driven by a binary function that is a member of an orthogonal set of functions, such as the Walsh functions.

In this example, because there are two described light sources, determining the light source from which the reflected light originated is the same as determining the region of the display from which the reflected light originated. However, in cases where backlight unit 124 includes more than two light sources, multiple light sources associated with a particular region of the display may be modulated with the same frequency. Light sensor 128, therefore, may be unable to determine the particular light source from which the reflected light originated, but will be able to determine a region of the display from which the light originated by virtue of the fact that all of the light sources within this region are modulated at the same frequency.

Continuing with the example above, backlight unit 124 determines the origin of reflected light 302 by demodulating the frequency of reflected light 302 and comparing the frequency of the reflected light to both the first frequency associated with first light source 202 and first region 206 of display 130, and to the second frequency associated with second light source 204 and second region 208 of display 130. In an embodiment, a photocurrent from light sensor 128 is amplified and band-pass filtered so as to provide two independent signal channels centered on the first frequency and the second frequency of the light sources. The signal channels are then rectified and integrated over a time period that is large compared to the first frequency and the second frequency, but short compared with human interaction timescales. This enables quick and low-computational-cost comparison of the frequency of the reflected light to the first frequency and the second frequency. In another embodiment, reflected light 302 can be demodulated using a digital modulation scheme, such as the Hadamard transform. For example, reflected light 302 can be demodulated using the Hadamard Transform, and data is clocked at the same clock rate as the basis frequency of the Walsh function used to modulate the light. It is to be appreciated, however, that other digital modulation schemes can be used to demodulate reflected light 302.

In another embodiment, backlight unit 124 determines the origin of reflected light 302 by demodulating reflected light 302 to determine an amplitude of the modulation function of reflected light 302. Then, backlight unit 124 compares the amplitude of the modulation function of reflected light 302 with an amplitude of the modulation function associated with first light source 202 and first region 206 of display 130, and with an amplitude of the modulation function associated with second light source 204 and second region 208 of display 130.

Continuing with example 300, after determining the region of display 130 from which reflected light 302 originated, backlight unit 124 can detect a position of object 304 relative to display 130. In this example, backlight unit 124 determines that object 304 is positioned in space relative to first region 206 of display 130 based on the determination that reflected light 302 originated from first region 206 of display 130. Thus, backlight unit 124 is able to detect a position of an object near display 130 without using a touchscreen or a camera.

Backlight unit 124 is further configured to determine a movement of an object near the display, such as movement from the right to the left side of display 130, from the left to the right side of display 130, from the top to the bottom of display 130, or from the bottom to the top of display 130. The ability to determine a movement of an object enables a user to perform various gestures to initiate corresponding events on display device 102. For instance, a user reading an electronic book rendered by display 130 may be able to move his hand from the right side to the left side of display 130 to initiate a page-turn gesture.

In FIG. 3, for example, object 304 moves from the right side to the left side of display 130. When this occurs, light 212 is reflected back towards display 130 as reflected light 306 when light 212 contacts object 304. Light sensor 128 receives reflected light 306, and backlight unit 124 determines whether reflected light 306 originated from first region 206 of display 130 or from second region 208 of display 130. Based on this determination, backlight unit 124 can detect an additional position of object 304 relative to display 130. In this example, backlight unit 124 can determine that object 304 is positioned in space relative to second region 208 of display 130 based on the determination that reflected light 306 originated from second region 208 of display 130.

Backlight unit 124 then determines a movement of the object based on the change in the position of the object. In this example, backlight unit 124 determines that object 304 moved from a position in space relative to first region 206 on the right side of display 130 to a position in space relative to second region 208 on the left side of display 130. Backlight unit 124 communicates the movement of object 304 to controller 122, which processes the movement to form a gesture. Controller 122 can then communicate the gesture to an operating system of display device 102 to initiate a variety of different events based on the gesture. For example, movement of the user's hand from the right side of display 130 to the left side of display 130 may be identified as a page-turn gesture for an electronic book, a volume-control gesture for an audio application, a channel-change gesture for a television application, a play-video gesture for a DVD application, to name just a few.

Backlight unit 124 may also be configured to identify movement of an object towards or away from display 130. In one embodiment, backlight unit 124 identifies movement of an object towards or away from the display 130 based on a change in the relative strength of the amplitude of reflected light. Continuing with the example above, if an amplitude of reflected light 302 is relatively stronger than an amplitude of reflected light 306, then display device 102 determines that object 304 is moving away from display 130. Alternately, if the amplitude of reflected light 302 is relatively weaker than the amplitude of reflected light 306, display device 102 determines that object 304 is moving closer to display 130.

Backlight unit 124 may also be configured to identify a speed of the movement of an object. Controller 122 may process the movement and the speed of the movement to form different gestures. For example, a rapid movement of the user's hand from the right side of display 130 to the left side of display 130 may be identified as chapter-change gesture, instead of just a page-turn gesture, for an electronic book. As another example, a rapid movement of the user's hand towards display 130 may be identified as a gesture to suppress information on display 130 for reasons of confidentiality. The speed of such rapid movements may be faster than the frame rate of a typical camera, however, in some embodiments backlight unit 124 is configured to respond to these movements within 10 milliseconds.

In one embodiment, backlight unit 124 is configured with at least a third light source 308 that is associated with a middle region of display 130 and is modulated at a third frequency. Third light source 308 enables backlight unit 124 to distinguish a variety of different gestures. For example, third light source 308 allows backlight unit to distinguish between a single object, such as a user's hand, moving from one side of the display to the other, and two objects, such as each of the user's hands, being positioned on either side of the display. In FIG. 3, for example, when object 304 moves from first region 206 on the right side of display 130 to second region 208 on the left side of display 130, additional reflected light (not pictured) from third light source 308 is reflected back towards display 130 and received by light sensor 128 before light sensor 128 receives reflected light 306 associated with second region 208 of display 130. This additional reflected light from third light source 308 indicates that object 304 crossed over the middle of display 130. Backlight unit 124, therefore, can determine that object 304 moved from first region 206 to second region 208 of display 130.

Alternately, if object 304 is positioned near first region 206 on the right side of display 130, and an additional object is positioned near second region 208 on the left side of display 130, light sensor 128 receives reflected light 302 associated with first region 206 as well as reflected light 306 associated with second region 208 of display 130. However, because light sensor 128 does not receive reflected light corresponding to third light source 308 in the middle of display 130, backlight unit 124 can determine that an object did not move from one side of the display to the other, and therefore determine that two objects are near the display.

Example Method

Figure 4:
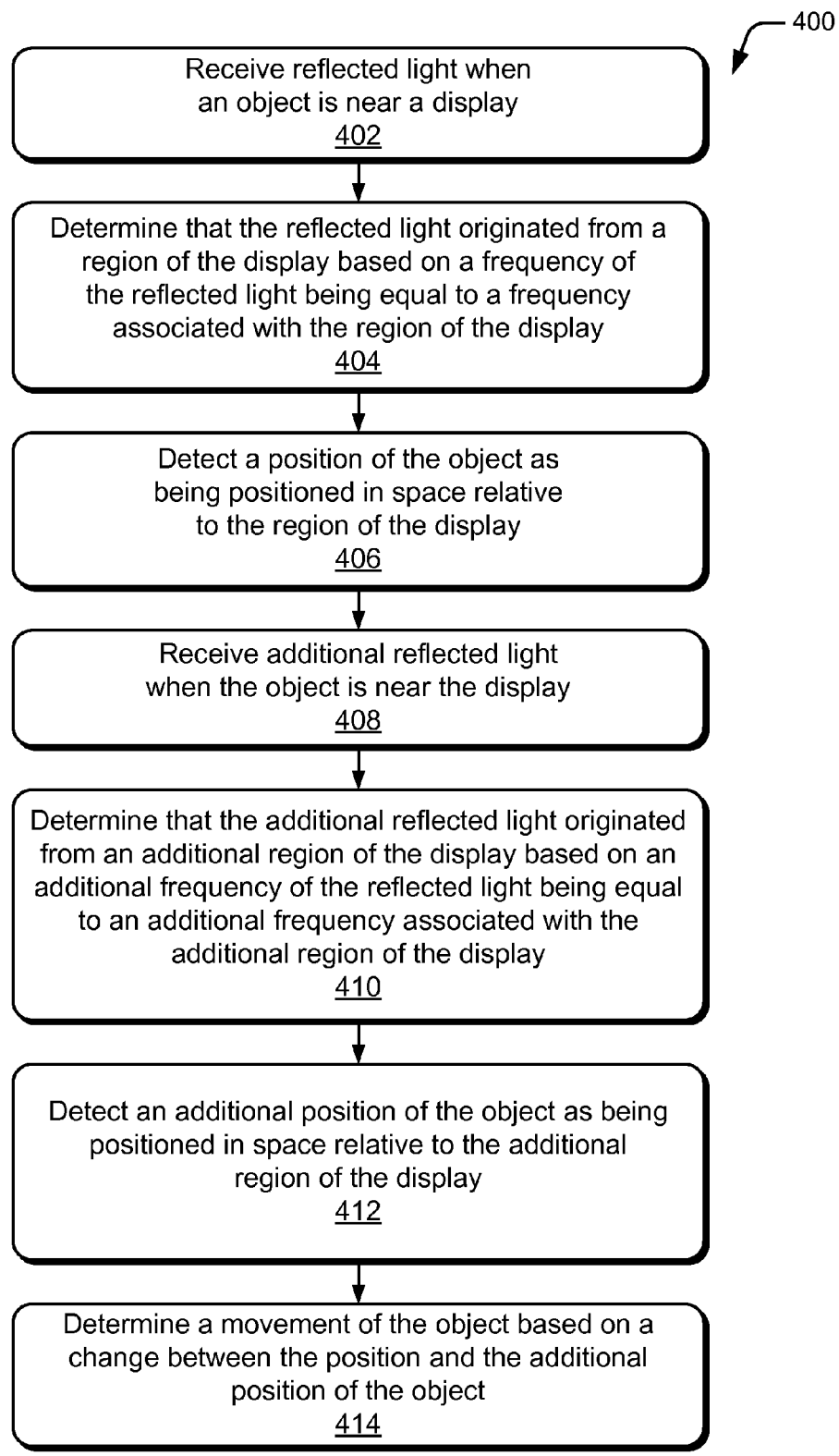
FIG. 4 illustrates an example method for detecting a position of an object near a display using an object-detecting backlight unit.

FIG. 4 is flow diagram depicting an example method 400 for detecting a position of an object near a display using an object-detecting backlight unit. Block 402 receives reflected light when an object is near a display. For example, light sensor 128 (FIG. 3) receives reflected light 302 when object 304 is near display 130. The reflected light is caused by light from an image being rendered by the display reflecting off of the object, such as reflected light 302 reflecting off of object 304.

Block 404 determines that the reflected light originated from a region of the display based on a frequency of the reflected light being equal to a frequency associated with the region of the display. For example, backlight unit 124 determines that reflected light 302 originated from first region 206 of display 130 based on a frequency of reflected light 302 being equal to a frequency associated with first region 206 of display 130.

Block 406 detects a position of the object as being positioned in space relative to the region of the display. For example, backlight unit 124 detects a position of object 304 as being positioned in space relative to first region 206 of display 130 based on reflected light 302 originating from first region 206 of display 130.

Block 408 receives additional reflected light when the object is near the display. For example, light sensor 128 receives reflected light 306 when object 304 is near display 130. In this example, the additional reflected light is caused by object 304 moving from first region 206 on the left side of display 130 to second region 208 on the right side of display 130.

Block 410 determines that the additional reflected light originated from an additional region of the display based on an additional frequency of the reflected light being equal to an additional frequency associated with the additional region of the display. For example, backlight unit 124 determines that reflected light 306 originated from second region 208 of display 130 based on a frequency of reflected light 306 being equal to a frequency associated with second region 208 of display 130.

Block 412 detects an additional position of the object as being positioned in space relative to the additional region of the display. For example, backlight unit 124 detects an additional position of object 304 as being positioned in space relative to second region 208 of display 130 based on reflected light 306 originating from second region 208 of display 130.

Block 414 determines a movement of the object based on a change between the position and the additional position of the object. For example, backlight unit 124 determines a movement of object 304 based on a change between object 304 being positioned on the right side of the display and then the left side of the display. In some embodiments, backlight unit 124 can then communicate the movement of object 304 to controller 122, which processes the movement to form a gesture. Controller 122 can then communicate the gesture to an operating system of display device 102 to initiate a variety of different events. For example, movement of the user's hand from the right side of display 130 to the left side of display 130 may be identified as a page-turn gesture for an electronic book, a volume-control gesture for an audio application, a channel-change gesture for a television application, or a play-video gesture for a DVD application.

Example Device

Figure 5:
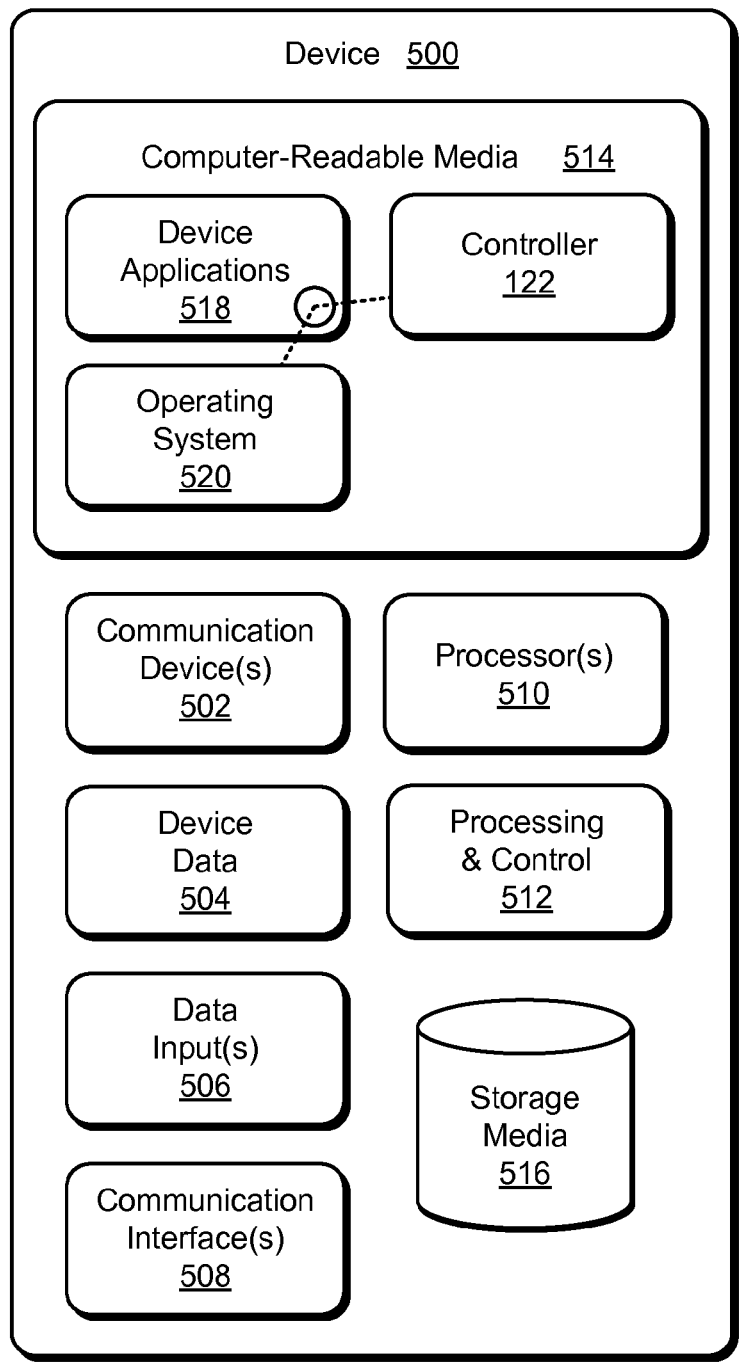
FIG. 5 illustrates an example device in which techniques for an object-detecting backlight unit can be implemented.

FIG. 5 illustrates various components of example device 500 that can be implemented as any type of client, server, and/or display device as described with reference to the previous FIGS. 1-4 to implement techniques enabling an object-detecting backlight unit. In embodiments, device 500 can be implemented as one or a combination of a wired and/or wireless device, as a form of flat panel display, television, television client device (e.g., television set-top box, digital video recorder (DVR), etc.), consumer device, computer device, server device, portable computer device, user device, communication device, video processing and/or rendering device, appliance device, gaming device, electronic device, and/or as another type of device. Device 500 may also be associated with a viewer (e.g., a person or user) and/or an entity that operates the device such that a device describes logical devices that include users, software, firmware, and/or a combination of devices.

Device 500 includes communication devices 502 that enable wired and/or wireless communication of device data 504 (e.g., received data, data that is being received, data scheduled for broadcast, data packets of the data, etc.). The device data 504 or other device content can include configuration settings of the device, media content stored on the device, and/or information associated with a user of the device. Media content stored on device 500 can include any type of audio, video, and/or image data. Device 500 includes one or more data inputs 506 via which any type of data, media content, and/or inputs can be received, such as user-selectable inputs, messages, music, television media content, recorded video content, and any other type of audio, video, and/or image data received from any content and/or data source.

Device 500 also includes communication interfaces 508, which can be implemented as any one or more of a serial and/or parallel interface, a wireless interface, any type of network interface, a modem, and as any other type of communication interface. The communication interfaces 508 provide a connection and/or communication links between device 500 and a communication network by which other electronic, computing, and communication devices communicate data with device 500.

Device 500 includes one or more processors 510 (e.g., any of microprocessors, controllers, and the like), which process various computer-executable instructions to control the operation of device 500 and to enable techniques for implementing an object-detecting backlight unit. Alternatively or in addition, device 500 can be implemented with any one or combination of hardware, firmware, a system-on-chip (SoC), or fixed logic circuitry that is implemented in connection with processing and control circuits which are generally identified at 512. Although not shown, device 500 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Device 500 also includes computer-readable storage media 514, such as one or more memory devices that enable persistent and/or non-transitory data storage (i.e., in contrast to mere signal transmission), examples of which include random access memory (RAM), non-volatile memory (e.g., any one or more of a read-only memory (ROM), non-volatile RAM (NVRAM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like. Device 500 can also include a mass storage media device 516.

Computer-readable storage media 514 provides data storage mechanisms to store the device data 504, as well as various device applications 518 and any other types of information and/or data related to operational aspects of device 500. For example, an operating system 520 can be maintained as a computer application with the computer-readable storage media 514 and executed on processors 510. The device applications 518 may include a device manager, such as any form of a control application, software application, signal-processing and control module, code that is native to a particular device, a hardware abstraction layer for a particular device, and so on.

The device applications 518 also include any system components or modules to implement techniques using or enabling an object-detecting backlight unit. In this example, the device applications 518 can include controller 122 for controlling and/or receiving data from an object-detecting backlight unit.

CONCLUSION

This document describes various apparatuses and techniques for implementing an object-detecting backlight unit. Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A display device comprising:
   a backlight unit comprising at least a light sensor, a first light source modulated at a first frequency and associated with a first region of a display, a second light source modulated at a second frequency and associated with a second region of the display, and a third light source modulated at a third frequency and associated with a third region of the display;
   the display configured to receive light from the first light source, the second light source, and the third light source and to form an image for viewing by projecting the light from the first light source out of the first region of the display, projecting the light from the second light source out of the second region of the display, and projecting the light from the third light source out of the third region of the display; and
   the light sensor of the backlight unit configured to receive reflected light from the image formed by the display when an object is near the display and determine whether the reflected light originated from the first region, the second region, or the third region of the display by demodulating the reflected light and comparing a frequency of the reflected light to the first frequency, the second frequency, and the third frequency, the backlight unit configured to detect a position of the object relative to the display based on whether the reflected light originated from the first region, the second region, or the third region of the display, the third region of the display comprising a middle region of the display.

2. A display device as described in claim 1, wherein the backlight unit is further configured to:
   detect the position of the object as being positioned in space relative to the first region of the display if the reflected light originated from the first region of the display; and
   detect the position of the object as being positioned in space relative to the second region of the display if the reflected light originated from the second region of the display.

3. A display device as described in claim 1, wherein the backlight unit is further configured to determine a movement of the object based on a change between the position of the object and an additional position of the object.

4. A display device as described in claim 3, wherein the backlight unit is further configured to communicate the movement of the object to a controller to initiate the controller processing the movement to form a gesture.

5. A display device as described in claim 4, wherein the gesture comprises one of a page-turn gesture, a volume-control gesture, or a channel-change gesture.

6. A display device as described in claim 1, wherein the display comprises a liquid crystal display (LCD).

7. A display device as described in claim 1, wherein the light sensor comprises an ambient light detector.

8. A method comprising:
   receiving reflected light when an object is near a display, the reflected light comprising light from an image being rendered by the display reflecting off of the object;
   determining whether the reflected light originated from a first region of the display, a second region of the display, or a third region of the display based on a frequency of the reflected light being equal to a first frequency associated with the first region of the display, a second frequency associated with the second region of the display, or a third frequency associated with the third region of the display; and
   detecting a position of the object as being positioned in space relative to the first region of the display responsive to determining that the frequency is equal to the first frequency, the first region of the display, the second region of the display, and the third region of the display each corresponding to respective areas on the display, at least one of the first, second, or third regions of the display comprising a middle region of the display.

9. A method as described in claim 8, wherein determining whether the reflected light originated from the first region of the display, the second region of the display, or the third region of the display further comprises:
   demodulating the reflected light to determine the frequency of the reflected light; and
   comparing the frequency of the reflected light to the first frequency associated with the first region of the display, the second frequency associated with the second region of the display, and the third frequency associated with the third region of the display.

10. A method as described in claim 8, further comprising:
    receiving additional reflected light when the object is near the display;
    determining whether the additional reflected light originated from the first region of the display or the second region of the display based on an additional frequency of the additional reflected light being equal to the first frequency associated with the first region of the display or the second frequency associated with the second region of the display;

detecting an additional position of the object as being positioned in space relative to the second region of the display responsive to determining that the additional frequency is equal to the second frequency; and determining a movement of the object based on a change between the position and the additional position of the object.

11. A method as described in claim 10, further comprising processing the movement of the object to form a gesture, and communicating the gesture to initiate an event.

12. A method as described in claim 8, wherein determining the movement of the object further comprises:

determining that the object is moving away from the display if an amplitude of the reflected light is relatively stronger than an additional amplitude of the additional reflected light; and determining that the object is moving towards the display if the amplitude of the reflected light is relatively weaker than the additional amplitude of the additional reflected light.

13. A method as described in claim 8, wherein the first region of the display comprises one of a left region of the display, a right region of the display, a top region of the display, or a bottom region of the display, and wherein the second region of the display comprises a different one of the left region of the display, the right region of the display, the top region of the display, or the bottom region of the display.

14. A backlight unit comprising:

three or more light sources configured to provide light to a display to form an image;

a light sensor configured to receive reflected light when an object is near the display and determine that the reflected light originated from a first region of the display, a second region of the display, or a third region of the display based on a comparison of a frequency of the reflected light to a first frequency associated with a first region of the display, a second frequency associated with the second region of the display, and a third frequency associated with a third region of the display, the reflected light comprising light from the image reflecting off of the object; and the backlight unit configured to detect a position of the object based on the region of the display from which the reflected light originated, the first region of the display, the second region of the display, and the third region of the display each corresponding to respective areas on the display, at least one of the first, second, or third regions of the display comprising a middle region of the display.

15. A backlight unit as described in claim 14, wherein the light sensor is configured to determine that the reflected light originated from the region of the display by:

demodulating the reflected light to determine the frequency of the reflected light;

comparing the frequency of the reflected light to the first frequency associated with the first region of the display and to the second frequency associated with the second region of the display; and determining that the reflected light originated from the first region of the display based on the frequency of the reflected light being equal to the first frequency associated with the first region of the display and determining that the reflected light originated from the second region of the display based on the frequency of the reflected light being equal to the second frequency associated with the second region of the display.

16. A backlight unit as described in claim 14, wherein the three or more light sources comprise three or more light-emitting diodes (LEDs).

17. A backlight unit as described in claim 14, wherein the display comprises a liquid crystal display (LCD).

18. A backlight unit as described in claim 14, wherein the light sensor comprises an ambient light detector.

19. A display device as described in claim 1, wherein the first frequency and the second frequency are invisible to the human eye.

20. A display device as described in claim 1, wherein the first region of the display comprises one of a left region, a right region, a top region, or a bottom region of the display, and wherein the second region of the display comprises a different one of the left region, the right region, the top region, or the bottom region of the display.

* * * * *